United States Patent
Ko et al.

(10) Patent No.: US 10,932,295 B2
(45) Date of Patent: Feb. 23, 2021

(54) WIRELESS COMMUNICATION METHOD AND WIRELESS COMMUNICATION TERMINAL FOR RECEIVING DATA FROM PLURALITY OF WIRELESS COMMUNICATION TERMINALS

(71) Applicant: WILUS INSTITUTE OF STANDARDS AND TECHNOLOGY INC., Seoul (KR)

(72) Inventors: Geonjung Ko, Gyeonggi-do (KR); Juhyung Son, Gyeonggi-do (KR); Jinsam Kwak, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

(21) Appl. No.: 15/843,524

(22) Filed: Dec. 15, 2017

(65) Prior Publication Data

US 2018/0110076 A1 Apr. 19, 2018

Related U.S. Application Data

(63) Continuation of application No. PCT/KR2016/006488, filed on Jun. 17, 2016.

(30) Foreign Application Priority Data

Jun. 17, 2015 (KR) .......... 10-2015-0086022
Jul. 13, 2015 (KR) .......... 10-2015-0098873
Aug. 28, 2015 (KR) .......... 10-2015-0122074

(51) Int. Cl.
*H04W 74/08* (2009.01)
*H04L 1/00* (2006.01)
(Continued)

(52) U.S. Cl.
CPC .......... *H04W 74/0833* (2013.01); *H04L 1/00* (2013.01); *H04L 1/1614* (2013.01);
(Continued)

(58) Field of Classification Search
CPC .......... H04W 74/0833; H04W 74/006; H04W 28/04; H04W 84/12; H04W 28/0278; H04W 74/08; H04L 1/1614; H04L 5/00
See application file for complete search history.

(56) References Cited

U.S. PATENT DOCUMENTS

2009/0046618 A1* 2/2009 Shiba .................. H04L 12/1868
370/312
2012/0207097 A1 8/2012 Lee et al.
(Continued)

FOREIGN PATENT DOCUMENTS

| WO | 2011/108832 | 9/2011 |
| WO | 2015/068968 | 5/2015 |
| WO | 2016/204574 | 12/2016 |

OTHER PUBLICATIONS

International Search Report for PCT/KR2016/006488 dated Oct. 10, 2016 and its English translation from WIPO (published as WO 2016/204574).

(Continued)

*Primary Examiner* — Hassan Kizou
*Assistant Examiner* — Abdullahi Ahmed
(74) *Attorney, Agent, or Firm* — Ladas & Parry, LLP

(57) ABSTRACT

A wireless communication terminal communicating wirelessly with a base wireless communication terminal and unassociated with the base wireless communication terminal is disclosed. The wireless communication terminal includes: a transceiver; and a processor configured to receive, by using the transceiver, a multi-station Block ACK frame which indicates whether at least one of MAC frames transmitted (Continued)

from at least one of wireless communication terminals is received by using a first field of the multi-station Block ACK frame for indicating an association identifier corresponding to an association of each of the at least one of wireless communication terminals and the base wireless communication terminal, from the base wireless communication terminal, and determine whether a MAC frame transmitted from the wireless communication terminal is received by the base wireless communication terminal based on whether a second field of the multi-station Block ACK frame includes a MAC address of the wireless communication terminal.

16 Claims, 25 Drawing Sheets

(51) Int. Cl.

| | |
|---|---|
| *H04L 5/00* | (2006.01) |
| *H04L 1/16* | (2006.01) |
| *H04W 28/04* | (2009.01) |
| *H04W 74/00* | (2009.01) |
| *H04W 84/12* | (2009.01) |
| *H04W 28/02* | (2009.01) |

(52) U.S. Cl.
CPC ........... *H04L 5/0055* (2013.01); *H04W 28/04* (2013.01); *H04W 74/006* (2013.01); *H04W 28/0278* (2013.01); *H04W 74/08* (2013.01); *H04W 84/12* (2013.01)

(56) References Cited

U.S. PATENT DOCUMENTS

| | | | |
|---|---|---|---|
| 2013/0064161 | A1 | 3/2013 | Hedayat et al. |
| 2013/0223345 | A1* | 8/2013 | Asterjadhi .............. H04L 69/04 370/328 |
| 2014/0036772 | A1* | 2/2014 | Asterjadhi ............ H04W 28/06 370/328 |
| 2015/0153440 | A1 | 6/2015 | Amizur et al. |
| 2016/0330722 | A1* | 11/2016 | Pantelidou .............. H04W 8/26 |
| 2017/0171878 | A1* | 6/2017 | Chun ........................ H04L 5/00 |
| 2018/0034595 | A1* | 2/2018 | Kim ...................... H04L 1/1614 |
| 2018/0288743 | A1* | 10/2018 | Choi ..................... H04W 76/10 |

OTHER PUBLICATIONS

Written Opinion of the International Searching Authority for PCT/KR2016/006488 dated Oct. 10, 2016 and its English machine translation by Google Translate (published as WO 2016/204574).

* cited by examiner

| RU Size Index | RU Size |
|---|---|
| 0 | 26 |
| 1 | 52 |
| 2 | 106 |
| 3 | 242 |

(a)

| RU Combination Index | Combination |
|---|---|
| 0 | 26, 26, 26, 26, 26, 26, 26, 26, 26 |
| 1 | 52, 52, 26, 52, 52 |
| 2 | 26, 26, 52, 26, 52, 52 |
| ... | ... |
| 25 | 242 |

WIRELESS COMMUNICATION METHOD AND WIRELESS COMMUNICATION TERMINAL FOR RECEIVING DATA FROM PLURALITY OF WIRELESS COMMUNICATION TERMINALS

CROSS-REFERENCE TO RELATED APPLICATIONS

This application is a continuation of International Patent Application No. PCT/KR2016/006488 filed on Jun. 17, 2016, which claims the priority to Korean Patent Application No. 10-2015-0086022 filed in the Korean Intellectual Property Office on Jun. 17, 2015, Korean Patent Application No. 10-2015-0098873 filed in the Korean Intellectual Property Office on Jul. 13, 2015, and Korean Patent Application No. 10-2015-0122074 filed in the Korean Intellectual Property Office on Aug. 28, 2015, the entire contents of which are incorporated herein by reference.

TECHNICAL FIELD

The present invention relates to a wireless communication method and a wireless communication terminal for increasing communication efficiency by receiving data from a plurality of wireless communication terminals.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel. Therefore, required is a technology capable of efficiently using bandwidths by simultaneously transmitting data between a plurality of terminals and base terminals.

DISCLOSURE

Technical Problem

An object of the present invention is to provide an efficient wireless communication method and wireless communication terminal.

Especially, an object of the present invention is to provide a wireless communication method and a wireless communication terminal for receiving data from a plurality of wireless communication terminals.

Technical Solution

According to an embodiment of the present invention, a base wireless communication terminal communicating with a wireless communication terminal wirelessly which is unassociated with the base wireless communication terminal, the base wireless communication terminal includes: a transceiver; and a processor. The processor may be configured to receive, by using the transceiver, a MAC frame transmitted from the wireless communication terminal, insert an identifier for an unassociated wireless communication terminal and a MAC address of the wireless communication terminal respectively into a first field and a second field of a multi-station Block ACK frame which indicates whether at least one of MAC frames transmitted from at least one of wireless communication terminals is received by using the first field of multi-station Block ACK frame for indicating an association identifier corresponding to an association of each of the at least one of wireless communication terminals and the base wireless communication terminal, and transmit the multi-station Block ACK frame. The identifier for an unassociated wireless communication terminal may not be allocated through an association with the base wireless communication terminal.

A value of the identifier for an unassociated wireless communication terminal may be out of a range of a value that the association identifier is able to be allocated. The value of the identifier for an unassociated wireless communication terminal may be generated based on the MAC address of the wireless communication terminal.

A value of the identifier for an unassociated wireless communication terminal may be a value pre-known to both the base wireless communication terminal and the wireless communication terminal.

The processor may be configured to transmit a trigger frame triggering random access, wherein the MAC frame transmitted from the wireless communication terminal is transmitted in response to the trigger frame.

The trigger frame may signal a frequency band allocated for random access by using a value of a specific association identifier, wherein the MAC frame transmitted from the wireless communication terminal is transmitted through the frequency band allocated for random access.

The MAC frame transmitted from the wireless communication terminal may be a management frame.

According to an embodiment of the present invention, a wireless communication terminal communicating wirelessly with a base wireless communication terminal and unassociated with the base wireless communication terminal, the wireless communication terminal includes: a transceiver; and a processor. The processor may be configured to receive, by using the transceiver, a multi-station Block ACK frame which indicates whether at least one of MAC frames transmitted from at least one of wireless communication terminals is received by using a first field of the multi-station Block ACK frame for indicating an association identifier corresponding to an association of each of the at least one of wireless communication terminals and the base wireless communication terminal, from the base wireless communication terminal, and determine, when the first field of the multi-station Block ACK frame includes an identifier for an unassociated wireless communication terminal, whether a MAC frame transmitted from the wireless communication terminal is received by the base wireless communication terminal based on whether a second field of the multi-station Block Ack frame includes a MAC address of the wireless communication terminal. The identifier for an unassociated wireless communication terminal may not be allocated through an association with the base wireless communication terminal.

A value of the identifier for an unassociated wireless communication terminal may be out of a range of a value that the association identifier is able to be allocated. The value of the identifier for an unassociated wireless communication terminal may be generated based on the MAC address of the wireless communication terminal.

A value of the identifier for an unassociated wireless communication terminal may be a value pre-known to both the base wireless communication terminal and the wireless communication terminal.

The processor may be configured to receive a trigger frame triggering random access from the base wireless communication terminal, transmit the MAC frame in response to the trigger frame, and determine whether the MAC frame transmitted in response to the trigger frame is received by the base wireless communication terminal based on the multi-station Block ACK frame.

The trigger frame may signal a frequency band allocated for random access by using a value of a specific association identifier. The processor may be configured to transmit the MAC frame through the frequency band allocated for random access in response to the trigger frame.

The MAC frame transmitted in response to the trigger frame may be a management frame.

According to an embodiment of the present invention, an operation method of a wireless communication terminal communicating with a base wireless communication terminal wirelessly and unassociated with the base wireless communication terminal, the method includes: receiving a multi-station Block ACK frame which indicates whether at least one of MAC frames transmitted from at least one of wireless communication terminals is received by using a first field of the multi-station Block ACK frame for indicating an association identifier corresponding to an association of each of the at least one of wireless communication terminals and the base wireless communication terminal, from the base wireless communication terminal, and determining, when the first field of the multi-station Block ACK frame includes an identifier for an unassociated wireless communication terminal, whether a MAC frame transmitted from the wireless communication terminal is received by the base wireless communication terminal based on whether a second field of the multi-station Block ACK frame includes a MAC address of the wireless communication terminal. The identifier for an unassociated wireless communication terminal may not be allocated through an association with the base wireless communication terminal.

A value of the identifier for an unassociated wireless communication terminal is out of a range of a value that the association identifier is able to be allocated. The value of the identifier for an unassociated wireless communication terminal is generated based on the MAC address of the wireless communication terminal.

A value of the identifier for an unassociated wireless communication terminal is a value pre-known to both the base wireless communication terminal and the wireless communication terminal.

Advantageous Effects

An embodiment of the present invention is to provide an efficient wireless communication method and wireless communication terminal.

Especially, an embodiment of the present invention provides an efficient wireless communication method and wireless communication terminal in a wireless communication environment in which a legacy wireless communication terminal and a non-legacy wireless communication terminal coexist.

DESCRIPTION OF DRAWINGS

FIG. 10 shows an index value indicating information on resource allocation in a trigger frame according to an embodiment of the present invention.

MODE FOR CARRYING OUT THE INVENTION

Figure 1:
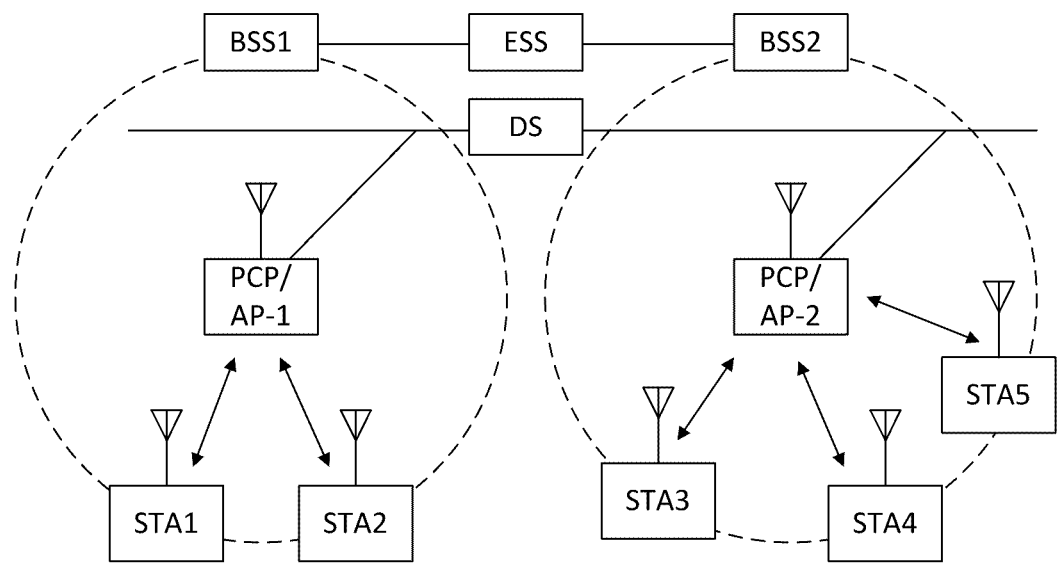
FIG. 1 is a view illustrating a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2015-0086022, Nos. 10-2015-00988732 and Nos. 10-2105-0122074 filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA_d, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
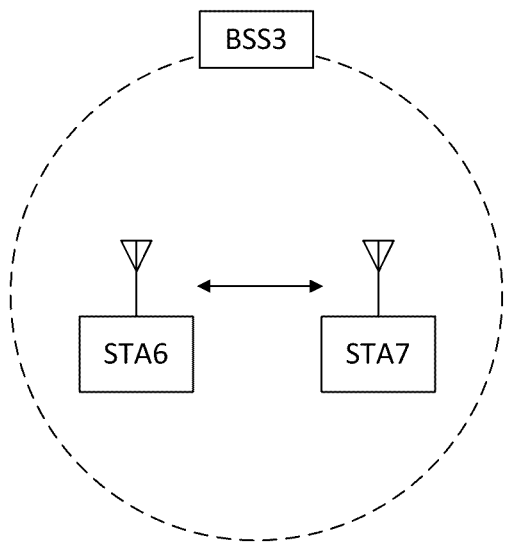
FIG. 2 is a view illustrating a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
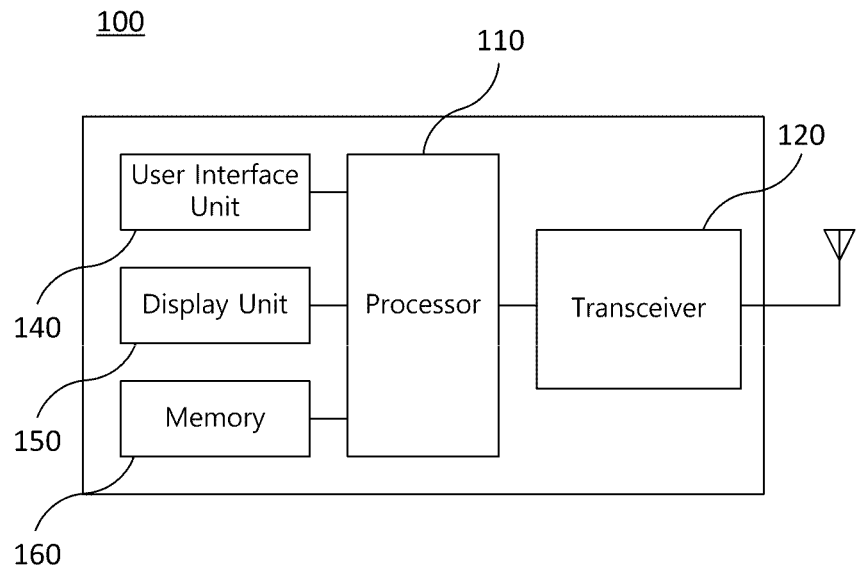
FIG. 3 is a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN packet, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modem which modulates wireless signal transmitted to the transceiver 120 and demodulates wireless signal received from the transceiver 120, or modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
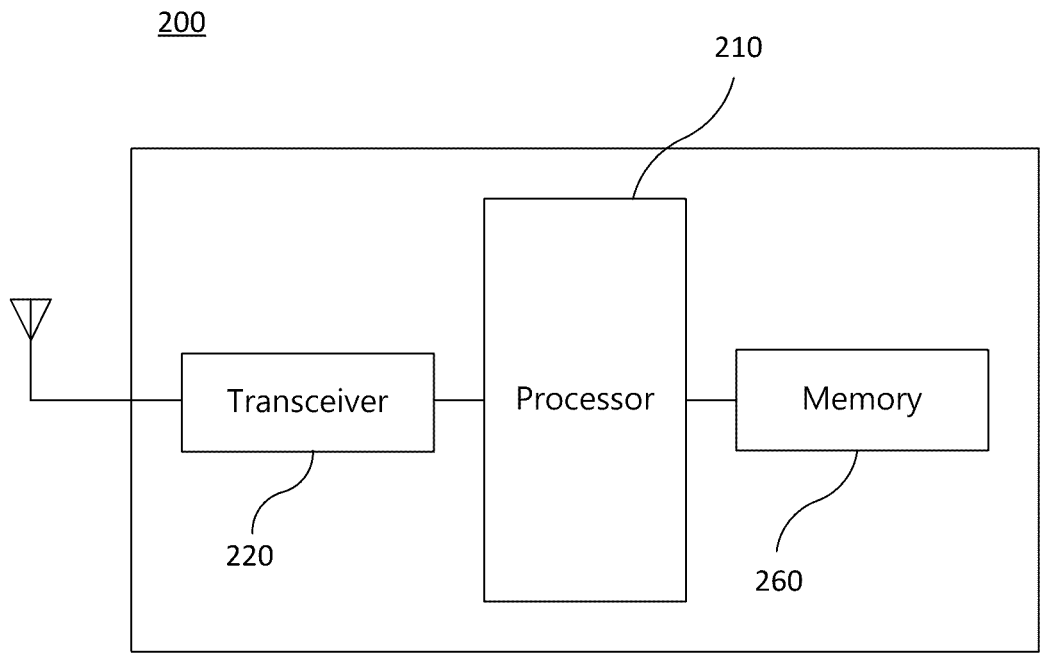
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modem which modulates wireless signal transmitted to the transceiver 220 and demodulates wireless signal received from the transceiver 220, or modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
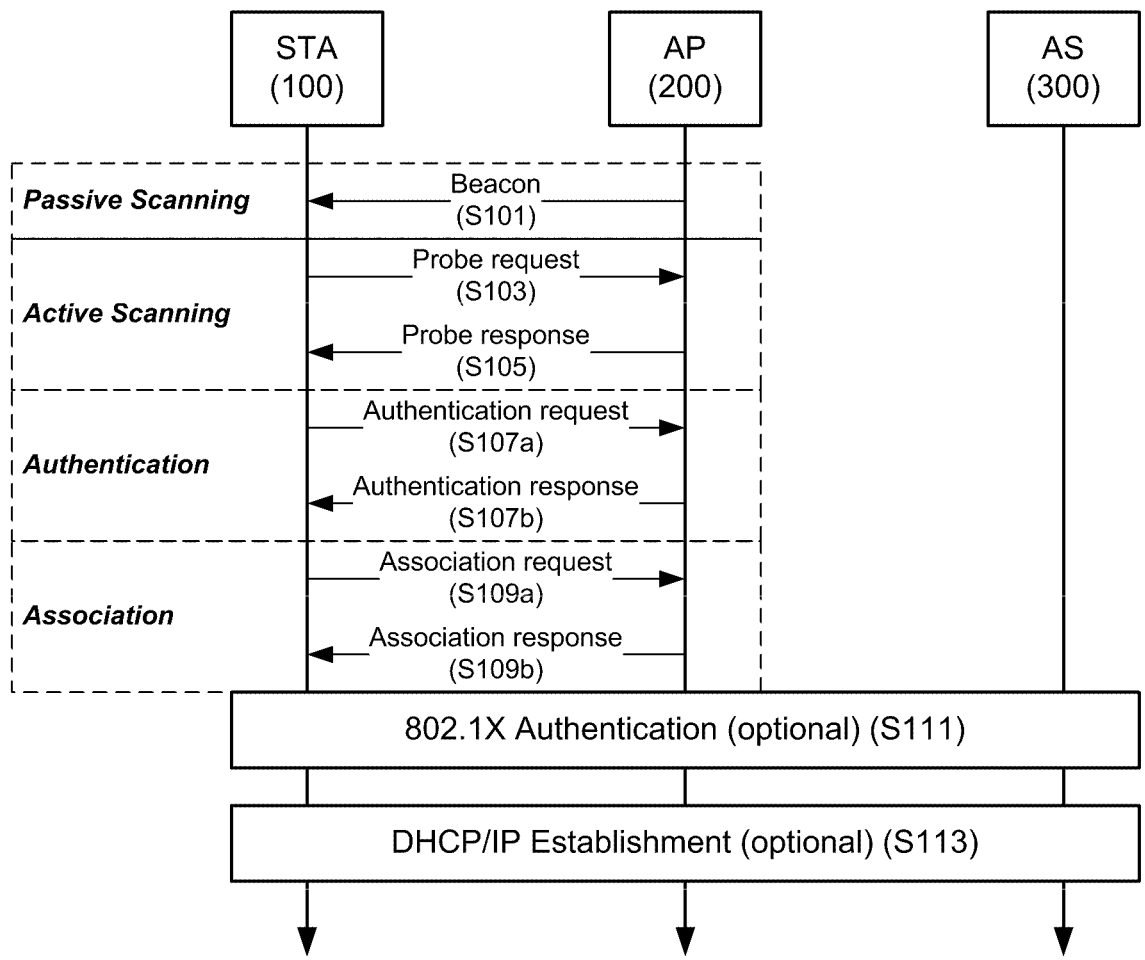
FIG. 5 is a view illustrating a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

When data is transmitted using Orthogonal Frequency Division Modulation (OFDMA) or Multi Input Multi Output (MIMO), any one wireless communication terminal may transmit data to a plurality of wireless communication terminals simultaneously. Also, any one wireless communication terminal may simultaneously receive data from a plurality of wireless communication terminals.

For convenience of description, any one wireless communication terminal that communicates simultaneously with a plurality of wireless communication terminals is referred to as a first wireless communication terminal and a plurality of wireless communication terminals that simultaneously communicate with the first wireless communication terminal are referred to as a plurality of second wireless communication terminals. In addition, the first wireless communication terminal may be referred to as a base wireless communication terminal (device). In addition, the first wireless communication terminal may be a wireless communication terminal that allocates a communication medium resource and performs scheduling in communication with a plurality of wireless communication terminals. Specifically, the first wireless communication terminal may perform the role of a cell coordinator. At this time, the first wireless communication terminal may be the access point 200. In addition, the second wireless communication terminal may be the station 100 associated with the access point 200. In a specific embodiment, the first wireless communication terminal may be a wireless communication terminal that allocates a communication medium resource and performs scheduling in an independent network, such as an ad-hoc network, which is not connected to an external distribution service. In addition, the first wireless communication terminal may be at least one of a base station, an eNB, and a transmission point TP.

Through FIGS. 6 to 31, an operation in which a plurality of second wireless communication terminals transmit data and a first wireless communication terminal receives data will be described. In particular, it is described that a first wireless communication terminal transmits a trigger frame, which is a MAC frame that triggers transmission of a plurality of second wireless communication terminals, and the plurality of second wireless communication terminals transmit an uplink Multi-User (MU) PLCP Protocol Data Unit (PPDU) to the first wireless communication terminal based on a trigger frame. At this time, the uplink MU PPDU is a PPDU that the plurality of second wireless communication terminals transmit to the first wireless communication terminal. Also, a downlink MU PPDU is a PPDU that the first wireless communication terminal transmits to the plurality of second wireless communication terminals. The first wireless communication terminal may transmit the downlink MU PPDU to the plurality of second wireless communication terminals using MU-MIMO or OFDMA. In addition, the plurality of second wireless communication terminals may transmit the uplink MU PPDU to the first wireless communication terminal using MU-MIMO or OFDMA.

Figure 6:
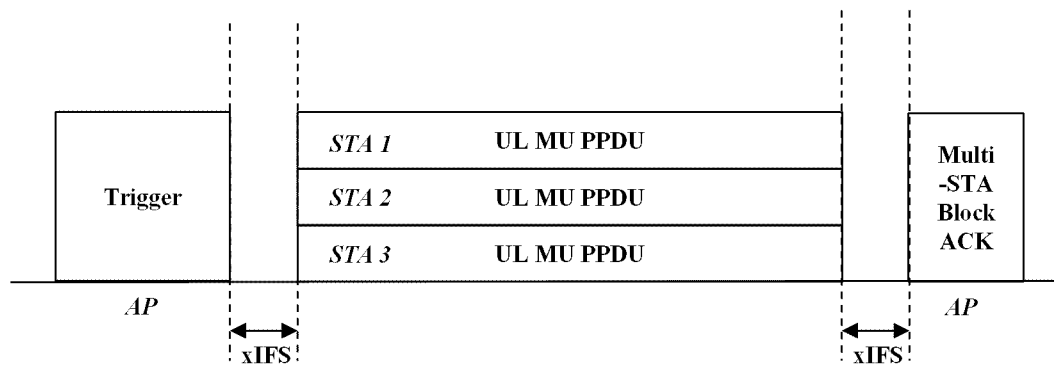
FIG. 6 shows a plurality of stations according to an embodiment of the present invention transmit an uplink MU PPDU to an access point based on a trigger frame.

FIG. 6 shows a plurality of stations according to an embodiment of the present invention transmit an uplink MU PPDU to an access point based on a trigger frame.

A first wireless communication terminal may trigger the transmission of a plurality of second wireless communication terminals by transmitting a trigger frame. Specifically, when the first wireless communication terminal transmits the trigger frame, the plurality of second wireless communication terminals may transmit the uplink MU PPDU to the first wireless communication terminal based on the trigger frame. At this time, the plurality of second wireless communication terminals may transmit the uplink MU PPDU to the first wireless communication terminal through OFDMA or MU-MIMO. Also, the uplink MU PPDU may include a data frame, a management frame, and a buffer status report. The data frame represents a MAC frame that includes data. The management frame represents a MAC frame for communication operations. The buffer status report represents information on a status of a buffer for storing data to be transmitted by a wireless communication terminal.

The first wireless communication terminal may transmit a MAC frame indicating whether the uplink MU PPDU is received or not.

In the embodiment of FIG. 6, the access point AP transmits a trigger frame.

First to third stations STA1 to STA3 receiving the trigger frame transmit the uplink MU PPDU to the access point AP through OFDMA. At this time, the first to third stations STA1 to STA3 transmit the uplink MU PPDU to the access point AP after a predetermined time xIFS from the reception of the trigger frame.

The access point AP transmits a multi-station block ACK frame Multi-STA Block ACK indicating whether the MAC frame included in the uplink MU PPDU transmitted from the first station STA1 to the third station STA3 is received, to the first to third stations STA1 to STA3. At this time, the access point AP transmits a multi-station block ACK frame Multi-STA Block ACK after a predetermined time xIFS from the time when the uplink MU PPDU is received from the first station STA1 to the third station STA3, to the first station STA1 to the third station STA3.

The first wireless communication terminal may transmit information on the transmission scheduling of the second wireless communication terminal to the plurality of second wireless communication terminals through the trigger frame. The information on transmission scheduling may include information on resource allocation. The information on the resource allocation may include information on a frequency band allocated to the plurality of second wireless communication terminals by the first wireless communication terminal. At this time, a unit of a frequency band used by the first wireless communication terminal and the second wireless communication terminal in the OFDMA communication may be referred to as a resource unit (RU). Frequency band allocation through the trigger frame will be described in detail with reference to FIGS. 7 and 8.

Figure 7:
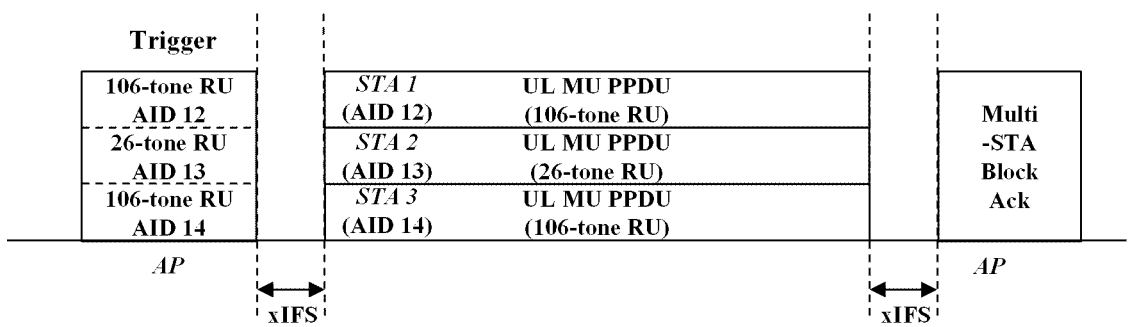
FIG. 7 shows that a plurality of stations according to an embodiment of the present invention transmit an uplink MU PPDU to an access point according to information on resource allocation indicated by a trigger frame.

FIG. 7 shows that a plurality of stations according to an embodiment of the present invention transmit an uplink MU PPDU to an access point according to information on resource allocation indicated by a trigger frame.

A first wireless communication terminal may assign a specific RU to a specific second wireless communication terminal. At this time, the specific second wireless communication terminal may be identified by at least one of an association identifier for identifying the association with the first wireless communication terminal in the trigger frame, an address identifier for identifying the address of the second wireless communication terminal, or a group identifier for identifying the group to which the second wireless communication terminal belongs. In a specific embodiment, the trigger frame may use a portion of an association identifier, an address identifier, or a group identifier. In addition, the trigger frame may be used by modifying an association identifier, an address identifier, or a group identifier. The association identifier may be an AID defined in 802.11. In addition, the group identifier may be a GID defined in 802.11. In addition, the address identifier may be a MAC address defined in 802.11.

In the embodiment of FIG. 7, the access point AP transmits a trigger frame. The trigger frame Trigger indicates that an RU including 106 tones is assigned to a station whose AID is 12. In addition, the trigger frame indicates that an RU including 26 tones is assigned to a station whose AID is 13. In addition, the trigger frame indicates that an RU including 106 tones is assigned to a station whose AID is 14.

The first to third stations STA1 to STA3 transmit the uplink MU PPDU to the access point AP based on the trigger frame. Specifically, the first station STA1 whose AID corresponds to 12 transmits the uplink MU PPDU to the access point AP through the RU including 106 tones. In addition, the second station STA2 whose AID corresponds to 13 transmits the uplink MU PPDU to the access point AP through the RU including 26 tones. In addition, the third station STA3 whose AID corresponds to 14 transmits the uplink MU PPDU to the access point AP through the RU including 106 tones. At this time, the first station STA1 to the third station STA3 transmit the uplink MU PPDU to the access point AP after a predetermined time xIFS from the time when the trigger frame is received.

The access point AP transmits a multi-station block ACK frame Multi-STA Block ACK indicating whether the MAC frame included in the uplink MU PPDU transmitted from the first station STA1 to the third station STA3 is received, to the first to third stations STA1 to STA3. At this time, the access point AP transmits a multi-station block ACK frame Multi- STA Block ACK after a predetermined time xIFS from the time when the uplink MU PPDU is received from the first station STA1 to the third station STA3, to the first station STA1 to the third station STA3.

When the first wireless communication terminal assigns a specific RU to a specific second wireless communication terminal, the first wireless communication terminal need to perform complicated process for resource allocation. In addition, the first wireless communication terminal may grasp all the communication conditions of the second wireless communication terminal to perform efficient resource allocation. In addition, when the first wireless communication terminal assigns a specific RU to a specific second wireless communication terminal, the first wireless communication terminal may not be able to receive the uplink MU PPDU from the second wireless communication terminal unassociated with the first wireless communication terminal. In order to solve this problem, the first wireless communication terminal may allow random access to the plurality of second wireless communication terminals. At this time, the trigger frame may indicate information on resource allocation for random access. This will be described in more detail with reference to FIG. 8.

Figure 8:
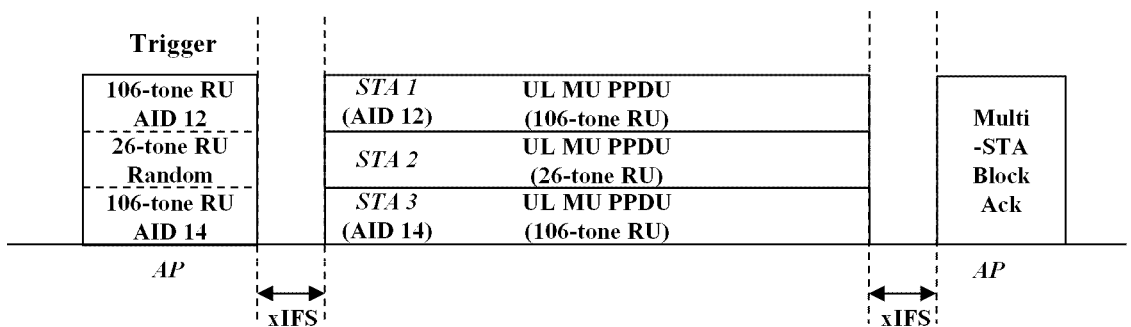
FIG. 8 shows that a plurality of stations according to an embodiment of the present invention perform a random access based on a trigger frame and transmit an uplink MU PPDU to an access point.

FIG. 8 shows that a plurality of stations according to an embodiment of the present invention perform a random access based on a trigger frame and transmit an uplink MU PPDU to an access point.

The trigger frame may indicate that a particular frequency band is allocated for random access. An associated second wireless communication terminal as well as an unassociated second wireless communication terminal may transmit an uplink MU PPDU over a frequency band allocated for random access. Also, the uplink MU PPDU may include a data frame, a management frame, and a Buffer Status Report (BSR) as described above. Accordingly, a plurality of second wireless communication terminals may multiplex different types of MAC frames in the frequency domain using OFDMA transmission and transmit the MAC frames to the first wireless communication terminal. For example, the data frame transmission of one of the second wireless communication terminals and the management frame transmission of another second wireless communication terminal may be multiplexed in the frequency domain through OFDMA. Also, any one of the second wireless communication terminals may transmit the data frame and the BSR to the first wireless communication terminal.

Accordingly, the plurality of second wireless communication terminals may transmit the BSR to the first wireless communication terminal through random access. Through this, the first wireless communication terminal may fairly provide the plurality of second wireless communication terminals an opportunity to transmit information on the buffer status. The BSR transmission of the second wireless communication terminal and the allocation of the frequency band to the plurality of second wireless communication terminals by the first wireless communication terminal based on the BSR will be described again with reference to FIGS. 11 and 12.

Additionally, the trigger frame may indicate a transmission condition of the second wireless communication terminal. The second wireless communication terminal may transmit the uplink MU PPDU to the first wireless communication terminal based on the transmission condition indicated by the trigger frame. Specifically, the transmission condition indicated by the trigger frame may include at least one of the length of the packet transmitted by the second wireless communication terminal, the transmission time, and the type of the response. At this time, the type of the response may be the type of the MAC frame included in the uplink MU PPDU.

Also, the second wireless communication terminal may determine the size of the frequency band for transmitting the uplink MU PPDU. At this time, the second wireless communication terminal may determine the size of the frequency band for transmitting the uplink MU PPDU in consideration of the transmission coverage. Specifically, the second wireless communication terminal may select an RU having a small frequency bandwidth from among a plurality of RUs, and transmit the MU PPDU through the selected RU. In another specific embodiment, the second wireless communication terminal may select the number of RUs that are to transmit the MU PPDU among the plurality of RUs. In another specific embodiment, the second wireless communication terminal may determine the size of the frequency band based on the required transmission coverage of the second wireless communication terminal, within a frequency band allocated for random access. For example, if the frequency bandwidth of the frequency band allocated for random access is 5 MHz and the size of the frequency bandwidth required for ensuring the required transmission coverage of the second wireless communication terminal is 2 MHz, the second wireless communication terminal may transmit the uplink MU PPDU with a frequency bandwidth of 2 MHz within the frequency band allocated for the random access. Through such an operation, the second wireless communication terminal may determine the transmission power density and transmission coverage.

As described with FIGS. 7 and 8, a specific format of a trigger frame indicating a frequency band allocated to a plurality of second wireless communication terminals will be described with reference to FIGS. 9 and 10.

Figure 9:
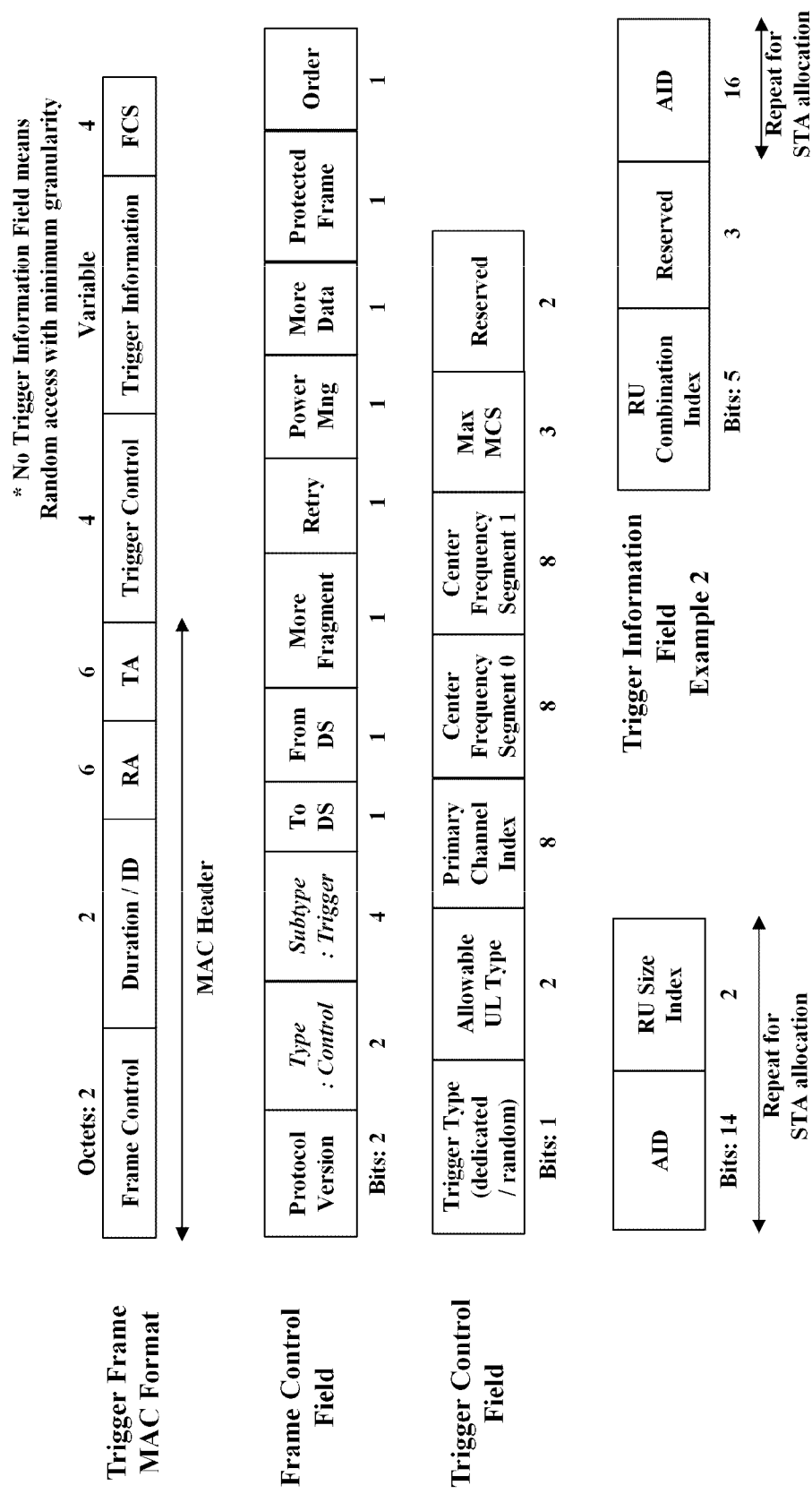
FIG. 9 shows a specific format of a trigger frame according to an embodiment of the present invention.

FIG. 9 shows a specific format of a trigger frame according to an embodiment of the present invention. FIG. 10 shows an index value indicating information on resource allocation in a trigger frame according to an embodiment of the present invention.

As described above, the trigger frame may indicate a frequency band allocated to the second wireless communication terminal. Specifically, the trigger frame may indicate a frequency band allocated to the second wireless communication terminal through information indicating a wireless communication terminal identifier that identifies the second wireless communication terminal and a bandwidth of the frequency band allocated to the second wireless communication terminal. At this time, the wireless communication terminal identifier may be AID. In a specific embodiment, the trigger frame may include information indicating a wireless communication terminal identifier and a bandwidth of a frequency band corresponding to the wireless communication terminal identifier. For example, the trigger frame may include an AID corresponding to a second wireless communication terminal that allocates a frequency band and an index indicating a bandwidth of a frequency band allocated to a second wireless communication terminal corresponding to the AID. At this time, the position of a frequency band may be allocated according to the AID order from the smallest frequency band used by the first wireless communication terminal. In addition, the index indicating the bandwidth of the frequency band allocated to the second wireless communication terminal may be as shown in a table of FIG. 10(a).

In another specific embodiment, the trigger frame may include information on a combination of a wireless communication terminal identifier and an RU assigned by the first wireless communication terminal to a plurality of second wireless communication terminals. For example, the trigger frame may include an index indicating a combination of RUs to be allocated to a plurality of second wireless communication terminals and an AID corresponding to the second wireless communication terminal with an RU allocated. At this time, the index indicating the combination of RUs to be allocated to the second wireless communication terminal may be as shown in the table of FIG. 10(b).

Although it is described with reference to FIGS. 10(a) and 10(b) based on a frequency band having a maximum of 242 tones, specific values of FIGS. 10(a) and 10(b) where a frequency band having more tones than 242 tones is used may be changed.

Also, the first wireless communication terminal may omit the frequency band allocation information in the trigger frame. In the case where the frequency band allocation information is omitted in the trigger frame, the trigger frame may indicate that the first wireless communication terminal permits random access to the frequency band divided by a predetermined value. Through this embodiment, the size of the trigger frame may be reduced.

The trigger frame may indicate whether to permit only the transmission of the designated second wireless communication terminal or whether to permit the random access of the second wireless communication terminal. Specifically, a frequency band allocated for random access may be represented by a specific value of an association identifier. At this time, the association identifier may be an AID. In addition, the specific value of the association identifier indicating the frequency band allocated for the random access may be a number other than 1 to 2007 used as the association identifier. Specifically, the specific value of the association identifier indicating the frequency band allocated for random access may be 0. Through this, the trigger frame may represent a frequency band for random access in the same format as allocating a frequency band to a specific second wireless communication terminal, without additional information.

In addition, the trigger frame may include operating channel information indicating information on a frequency band used by the first wireless communication terminal. The operating channel information may include at least one of information on a primary channel and information on a center frequency. More specifically, the information on the primary channel may be index information indicating the position of the primary channel. In a specific embodiment, the second wireless communication terminal unassociated with the first wireless communication terminal may access the frequency band for uplink transmission through the operating channel information. At this time, the uplink transmission indicates that the second wireless communication terminal transmits the uplink MU PPDU to the first wireless communication terminal.

The trigger frame may include trigger type information indicating the type of the trigger. In addition, the trigger frame may include Allowable UL Type information indicating a type of a response to the trigger. Specifically, the type of the response may include at least one of a data frame, a management frame, and no limitation. In a specific embodiment, the allowed uplink type information may be represented by the type and subtype information of a frame.

The trigger frame may include MCS information indicating information on the MCS allowed to the second wireless communication terminal. Specifically, the MCS information may indicate the maximum value of the MCS that may be used by the trigger frame.

In the embodiment of FIG. 9, the trigger frame includes a Frame Control field indicating information on frame control, a Duration/ID field indicating information on the duration of the frame, an RA field indicating the address of a wireless communication terminal receiving the trigger frame, a TA field indicating the address of a wireless communication terminal transmitting the trigger frame, a Trigger Control field indicating information on the trigger control, and a Trigger Information field indicating information on the trigger.

In the Frame Control field, the type field may represent a control frame. Also, the subtype field may be a value specified for the trigger frame. Also, at least one of the More Fragment field and the More Data field in the Frame control field may be used for additional information transmission.

The Duration/ID field may indicate the length of the uplink MU PPDU allowed by the trigger frame.

The Trigger Control field may include at least one of the trigger type information, allowed uplink type information, operating channel information, and MCS information described above.

The Trigger Information field may include information on the combination of the wireless communication terminal identifier described above and the RUs assigned to the plurality of second wireless communication terminals by the first wireless communication terminal.

The Transmit Opportunity (TXOP) represents a time section during which a wireless communication terminal may use a wireless medium without a separate contention procedure. The wireless communication terminal has the opportunity to obtain the TXOP through the contention procedure and to transmit the PPDU within the obtained TXOP. However, in order that any one of the wireless communication terminals transmits a PPDU to another wireless communication terminal, one of the wireless communication terminals transmits another PPDU to another wireless communication terminal, or another wireless communication terminal transmits a PPDU to one of the wireless communication terminals, the TXOP must be acquired again through the contention procedure. Repetition of such a contention procedure may impair transmission efficiency. To solve this problem, a plurality of MU PPDU transmissions within a TXOP may be allowed through a trigger frame. This will be described with reference to FIGS. 11 to 15.

Figure 11:
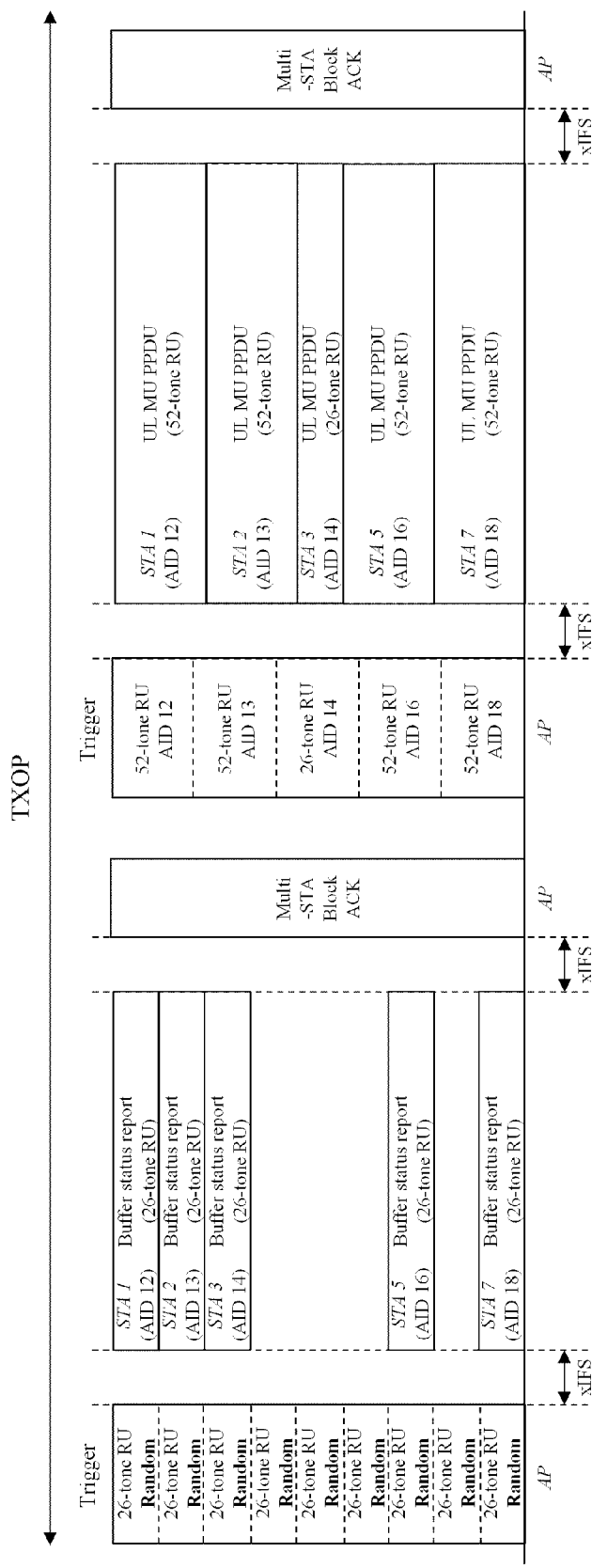
FIG. 11 shows that a plurality of stations according to an embodiment of the present invention transmit buffer status information to an access point in one TXOP, receive allocated resources from an access point, and transmit an uplink MU PPDU.
Figure 12:
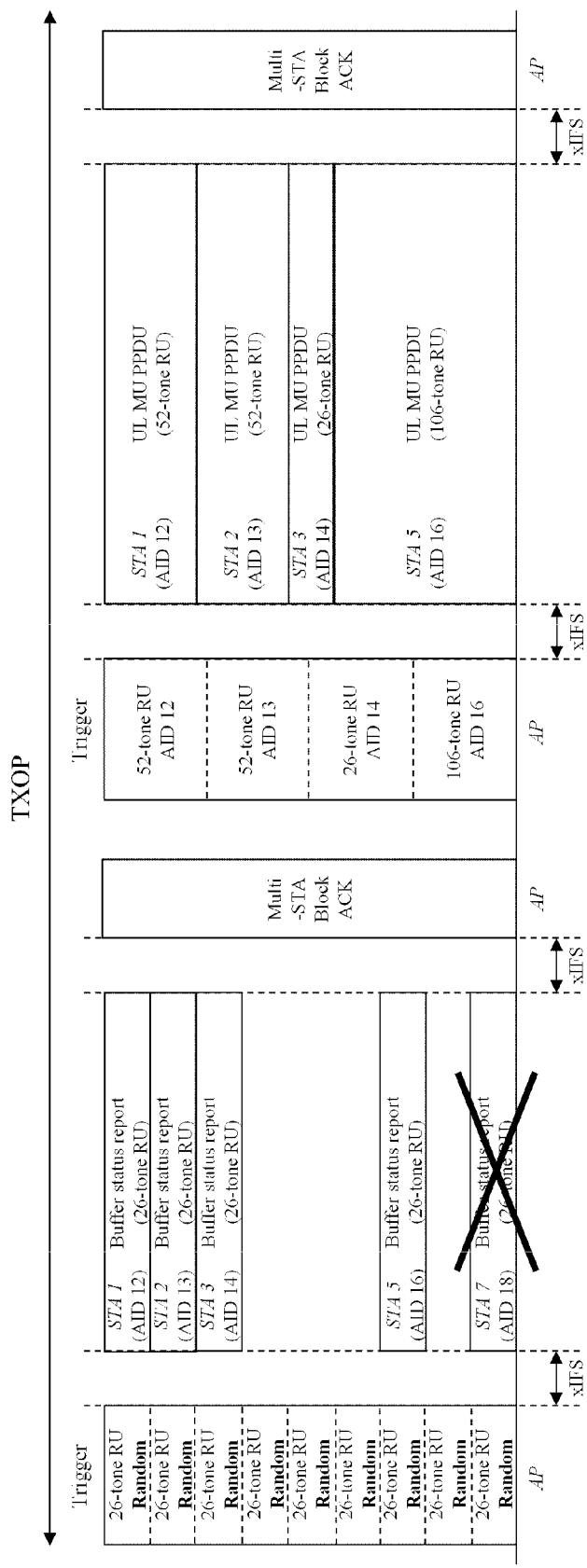
FIG. 12 shows that a plurality of stations according to another embodiment of the present invention transmit buffer status information to an access point in one TXOP, receive allocated resources from an access point, and transmit an uplink MU PPDU.

FIGS. 11 and 12 show that a plurality of stations according to an embodiment of the present invention transmit buffer status information to an access point in one TXOP, receive allocated resources from an access point, and transmit a PPDU.

A plurality of second wireless communication terminals may continuously transmit the uplink MU PPDU to the first wireless communication terminal based on the trigger frame in one TXOP. Specifically, in the TXOP obtained by the first wireless communication terminal through the contention procedure, a plurality of second wireless communication terminals may continuously transmit the uplink MU PPDU to the first wireless communication terminal based on the trigger frame. At this time, the first trigger frame may indicate a random access. Specifically, the second wireless communication terminal and the first wireless communication terminal may operate as follows.

As described above, the plurality of second wireless communication terminals may transmit the BSR to the first wireless communication terminal through the random access. Through this, the first wireless communication terminal may guarantee an opportunity to transmit information on the buffer status to the plurality of second wireless communication terminals. The information on the buffer status may be a BSR.

At this time, the plurality of second wireless communication terminals may transmit the uplink MU PPDU including the BSR to the first wireless communication terminal through the random access. Also, the uplink MU PPDU may include at least one of a data frame and a management frame together with the BSR.

The first wireless communication terminal allocates transmission scheduling to a plurality of second wireless communication terminals based on the received BSR. Through this, the first wireless communication terminal may trigger the transmission of the second wireless communication terminal in consideration of the buffer status of the second wireless communication terminal. Also, the first wireless communication terminal transmits to the plurality of second wireless communication terminals a MAC frame indicating whether or not the MAC frame included in the uplink MU PPDU including the BSR is received.

The first wireless communication terminal transmits a trigger frame indicating transmission scheduling to a plurality of second wireless communication terminals without an additional contention procedure.

The second wireless communication terminal transmits the uplink MU PPDU to the first wireless communication terminal based on the trigger frame.

The first wireless communication terminal transmits, to the plurality of second wireless communication terminals, a MAC frame indicating whether or not the MAC frame included in the uplink MU PPDU is received.

In the embodiment of FIG. 11, the access point AP transmits a trigger frame indicating random access. At this time, the access point AP obtains the TXOP through the contention procedure and transmits the trigger frame.

The first to third stations STA1 to STA3, the fifth station STA5, and the seventh station STA7 transmit the uplink MU PPDU including the BSR to the access point AP.

The access point AP transmits a multi-station block ACK Multi-STA Block ACK indicating whether the MAC frame included in the uplink MU PPDU is received, to the first station STA1 to the third station STA3, the fifth station STA5, and the seventh station STA7.

The access point AP allocates resources to each of the first station STA1 to the third station STA3, the fifth station STA5, and the seventh station STA7 based on the BSR transmitted by the first to third stations STA1 to STA3, the fifth station STA5, and the seventh station STA7. Specifically, the access point AP allocates frequency bands for uplink MU PPDU transmission to the first to third stations STA1 to STA3, the fifth station STA5, and the seventh station STA7.

The access point AP transmits a trigger frame indicating resources allocated to the first station STA1 to the third station STA3, the fifth station STA5, and the seventh station STA7. The first to third stations STA1 to STA3, the fifth station STA5, and the seventh station STA7 transmit the uplink MU PPDU to the access point AP based on the trigger frame. Specifically, the first to third stations STA1 to STA3, the fifth station STA5, and the seventh station STA7 transmit the uplink MU PPDU to the access point AP based on the allocated resources.

The access point AP transmits a multi-station block ACK Multi-STA Block ACK indicating whether the MAC frame included in the uplink MU PPDU is received, to the first station STA1 to the third station STA3, the fifth station STA5, and the seventh station STA7.

The first wireless communication terminal may not receive information on the buffer status transmitted by the second wireless communication terminal due to a transmission collision or the like. In such a case, the first wireless communication terminal allocates resources to the plurality of second wireless communication terminals based on the received information on the buffer status.

In the embodiment of FIG. 12, the access point AP does not receive the BSR transmitted by the seventh station STAT unlike the embodiment of FIG. 11.

Accordingly, the access point AP allocates resources to each of the first station STA1 to the third station STA3 and the fifth station STA5 based on the BSR transmitted from the first station STA1 to the third station STA3 and the fifth station STA5. Specifically, the access point AP allocates a frequency band for uplink MU PPDU transmission to the first station STA1 to the third station STA3 and the fifth station STA5.

The access point AP transmits a trigger frame indicating an allocated resource to each of the first station STA1 to the third station STA3 and the fifth station STA5.

The first STA1 to the third station STA3 and the fifth station STA5 transmit the uplink MU PPDU to the access point AP based on the trigger frame. Specifically, the first STA1 to the third station STA3 and the fifth station STA5 transmit an uplink MU PPDU to an access point AP based on the allocated resources.

The access point AP transmits a multi-station block ACK Multi-STA Block ACK indicating whether the MAC frame included in the uplink MU PPDU is received, to the first station STA1 to the third station STA3 and the fifth station STA5.

Figure 13:
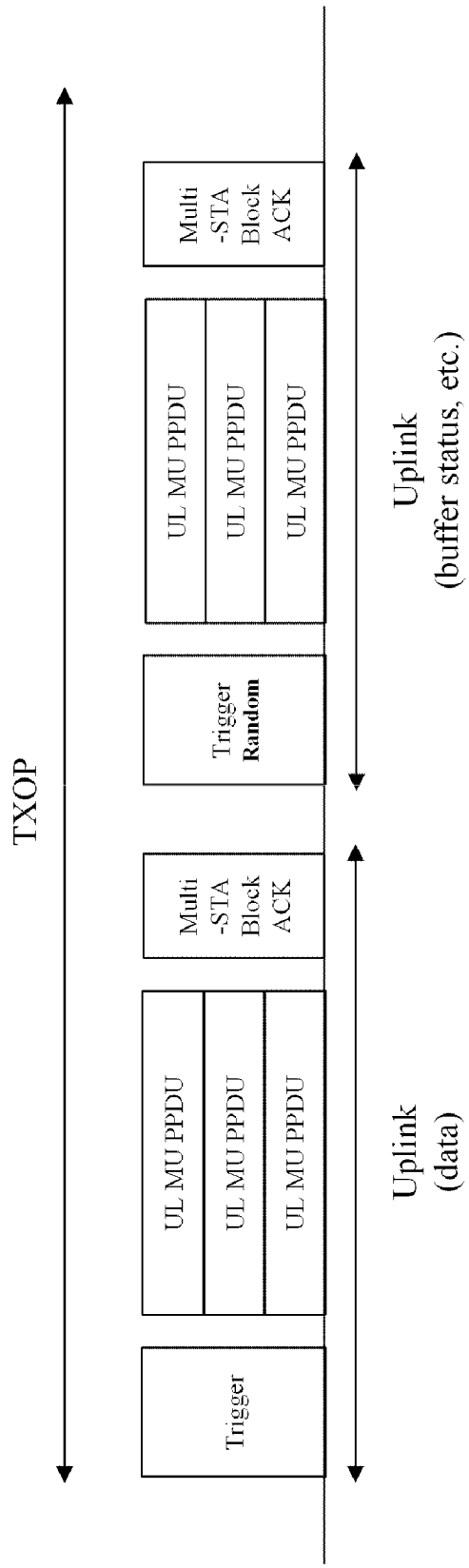
FIG. 13 shows that a plurality of stations continuously transmit uplink MU PPDUs in one TXOP according to an embodiment of the present invention.

FIG. 13 shows that a plurality of stations continuously transmit PPDUs in one TXOP according to an embodiment of the present invention.

As described with reference to FIGS. 11 and 12, a plurality of second wireless communication terminals may continuously transmit the uplink MU PPDU to the first wireless communication terminal based on the trigger frame during one TXOP. In the case of FIGS. 11 and 12, the first trigger frame represents a random access. However, after transmitting the uplink MU PPDU to the first wireless communication terminal, a plurality of second wireless communication terminals may transmit the uplink MU PPDU to the first wireless communication terminal again in one TXOP based on a trigger frame for allocating resources to a specific second wireless communication terminal.

In the embodiment of FIG. 13, the access point AP transmits a trigger frame that allocates resources, to a specific station. At this time, the access point AP may obtain the TXOP through the contention procedure and transmit the trigger frame.

The plurality of stations transmit the uplink MU PPDU including the data frame to the access point AP based on the trigger frame.

The access point AP transmits a multi-station block ACK Multi-STA Block ACK indicating whether or not the MAC frame included in the uplink MU PPDU transmitted by the plurality of stations is received, to the access point AP.

The access point AP transmits a trigger frame indicating a random access without a separate contention procedure.

The plurality of stations transmit the uplink MU PPDU to the access point AP based on the trigger frame. At this time, the uplink MU PPDU may include at least one of buffer status information, a data frame, and a management frame. Accordingly, a plurality of stations may multiplex different types of MAC frames in the frequency domain and transmit the MAC frames to an access point AP, through OFDMA transmission. For example, the data frame transmission of one station and the management frame transmission of another station may be multiplexed in the frequency domain through OFDMA. Also, any one of the stations may transmit a data frame and a BSR to an access point AP.

The access point AP transmits a multi-station block ACK Multi-STA Block ACK indicating whether or not the MAC frame included in the uplink MU PPDU transmitted by the plurality of stations is received, to the access point AP.

It is described with reference to FIGS. 11 to 13 that the plurality of second wireless communication terminals continuously transmit the uplink MU PPDU to the first wireless communication terminal based on the trigger frame during one TXOP. A plurality of second wireless communication terminals and a first wireless communication terminal may alternately transmit MU PPDUs based on a trigger frame in one TXOP. This will be described with reference to FIGS. 14 and 15.

Figure 14:
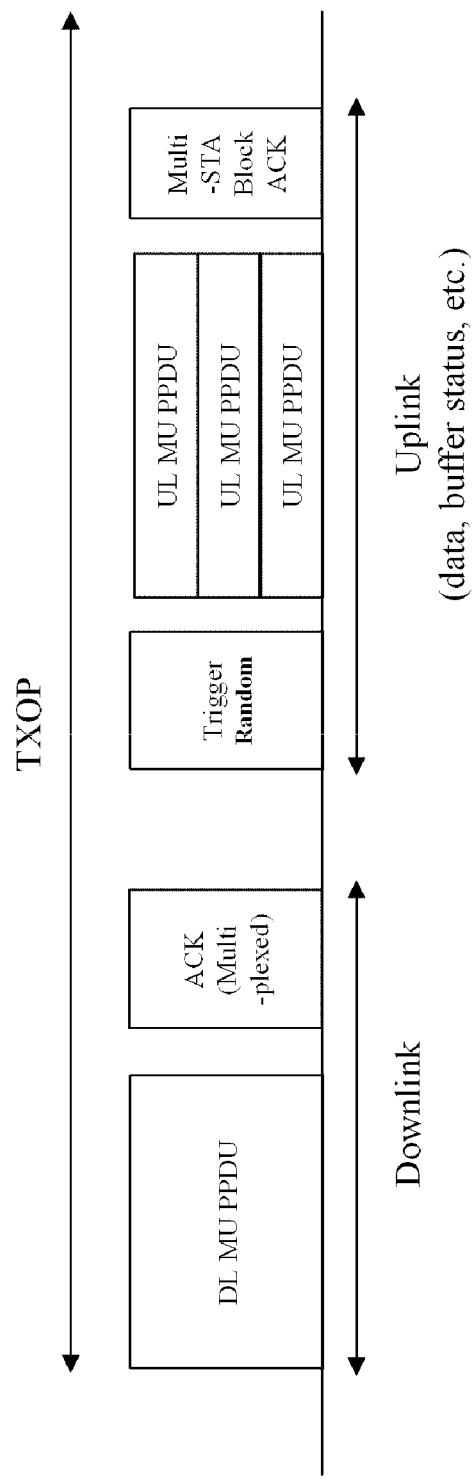
FIG. 14 shows that an access point according to an embodiment of the present invention transmits downlink MU PPDUs to a plurality of stations and a plurality of stations transmit uplink MU PPDUs to an access point in one TXOP.

FIG. 14 shows that an access point according to an embodiment of the present invention transmits uplink MU PPDUs to a plurality of stations and a plurality of stations transmit downlink PPDUs to an access point in one TXOP.

In one TXOP, after the first wireless communication terminal transmits the downlink MU PPDU to the plurality of second wireless communication terminals, the plurality of second wireless communication terminals may transmit the uplink MU PPDU to the first wireless communication terminal. Specifically, a plurality of second wireless communication terminals may transmit an uplink MU PPDU to a first wireless communication terminal in the TXOP obtained by the first wireless communication terminal to transmit the downlink MU PPDU through the contention procedure. At this time, the first wireless communication terminal may transmit the trigger frame to the plurality of second wireless communication terminals, and the plurality of second wireless communication terminals may transmit the uplink MU PPDU to the first wireless communication terminal based on the trigger frame. In a specific embodiment, the trigger frame may represent a random access. Also, the uplink MU PPDU may include at least one of information on a buffer status, a data frame, and a management frame. Accordingly, a plurality of second wireless communication terminals may multiplex different types of MAC frames in the frequency domain using OFDMA transmission and transmit the MAC frames to the first wireless communication terminal. For example, the data frame transmission of one of the second wireless communication terminals and the management frame transmission of another second wireless communication terminal may be multiplexed in the frequency domain through OFDMA. Also, any one of the second wireless communication terminals may transmit the data frame and the BSR to the first wireless communication terminal.

Also, in a specific embodiment, the first wireless communication terminal may transmit the trigger frame together while transmitting the downlink MU PPDU including the data frame. Through this, the first wireless communication terminal may reduce the time required for transmission to the PPDU.

In the embodiment of FIG. 14, an access point AP transmits downlink MU PPDUs to a plurality of stations. The access point AP acquires the TXOP through a contention procedure and transmits the downlink MU PPDU to a plurality of stations.

The plurality of stations transmit an ACK frame for downlink MU PPDU transmission to the access point AP. At this time, a plurality of stations may transmit an ACK frame for downlink MU PPDU transmission using OFDMA.

The access point AP transmits a trigger frame indicating a random access without a separate contention procedure.

The plurality of stations transmit the uplink MU PPDU to the access point AP based on the trigger frame. At this time, the uplink MU PPDU may include at least one of buffer status information, a data frame, and a management frame. Accordingly, a plurality of stations may multiplex different types of MAC frames in the frequency domain and transmit them to an access point AP, through OFDMA transmission. For example, the data frame transmission of one station and the management frame transmission of another station may be multiplexed in the frequency domain through OFDMA. Also, any one of the stations may transmit a data frame and a BSR to an access point AP.

The access point AP transmits a multi-station block ACK frame Multi-STA Block ACK indicating whether or not the MAC frame included in the uplink MU PPDU transmitted by the plurality of stations is received, to the access point AP.

Figure 15:
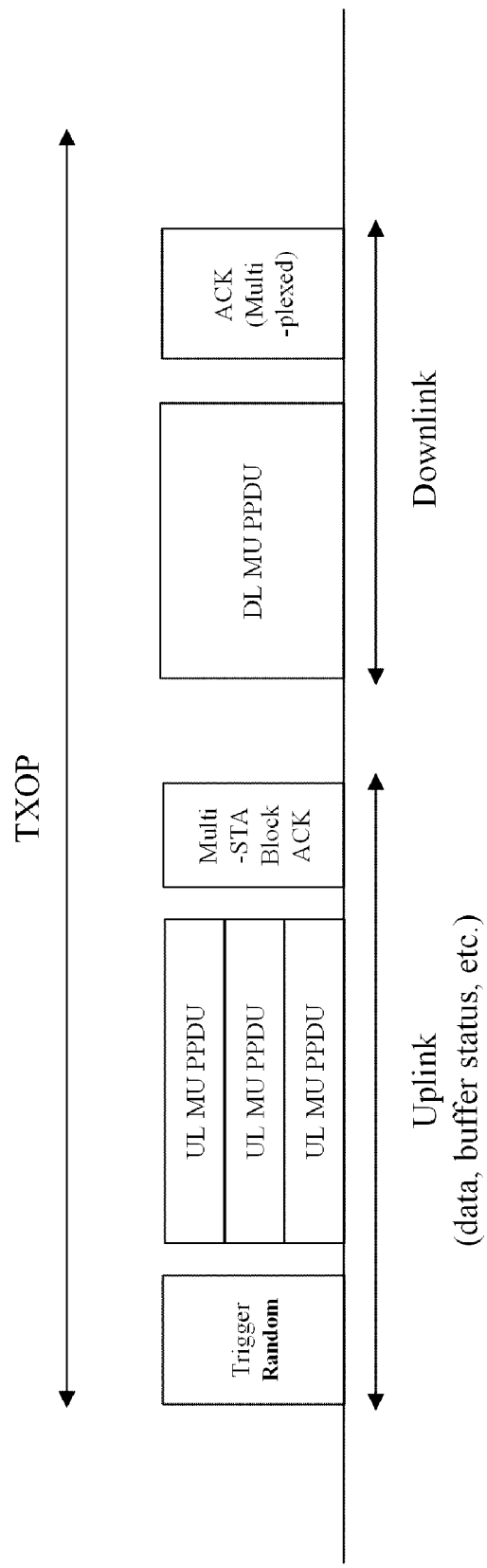
FIG. 15 shows that a plurality of stations according to an embodiment of the present invention transmit an uplink MU PPDU to an access point, and an access point transmits downlink MU PPDUs to a plurality of stations in one TXOP.

FIG. 15 shows that a plurality of stations according to an embodiment of the present invention transmit an uplink MU PPDU to an access point, and an access point transmits downlink MU PPDUs to a plurality of stations in one TXOP.

In one TXOP, a plurality of second wireless communication terminals may transmit uplink MU PPDUs to a first wireless communication terminal and a first wireless communication terminal may transmit downlink MU PPDUs to a plurality of second wireless communication terminals. Specifically, the first wireless communication terminal may acquire the TXOP through the contention procedure to transmit the trigger frame, and the plurality of second wireless communication terminals may transmit the uplink MU PPDU based on the trigger frame. At this time, in the same TXOP, the first wireless communication terminal may transmit the downlink MU PPDU to a plurality of second wireless communication terminals without a separate contention procedure.

At this time, the first wireless communication terminal transmits to the plurality of second wireless communication terminals an ACK frame indicating whether a MAC frame included in a down link MU PPDU including a data frame and an uplink MU PPDU transmitted by the plurality of second wireless communication terminals is received together.

In the embodiment of FIG. 15, the access point AP transmits a trigger frame indicating random access.

The plurality of stations transmit the uplink MU PPDU to the access point AP based on the trigger frame. At this time, the uplink MU PPDU may include at least one of buffer status information, a data frame, and a management frame. Accordingly, a plurality of stations may multiplex different types of MAC frames in the frequency domain and transmit the MAC frames to an access point AP, through OFDMA transmission. For example, the data frame transmission of one station and the management frame transmission of another station may be multiplexed in the frequency domain through OFDMA. Also, any one of the stations may transmit a data frame and a BSR to an access point AP.

The access point AP transmits a multi-station block ACK frame Multi-STA Block ACK indicating whether or not the MAC frame included in the uplink MU PPDU transmitted by the plurality of stations is received, to the access point (AP).

The AP transmits downlink MU PPDUs to a plurality of stations without a separate contention procedure.

The plurality of stations transmit an ACK frame for downlink MU PPDU transmission to the AP. At this time, a plurality of stations may transmit an ACK frame for downlink MU PPDU transmission using OFDMA.

As described above, when a plurality of second wireless communication terminals transmit the uplink MU PPDU to the first wireless communication terminal, the first wireless communication terminal may transmit ACK for the MAC frame included in the uplink MU PPDU transmitted by the second wireless communication terminal. At this time, the ACK frame may be referred to as a multi-station block ACK frame Multi-STA Block ACK. A specific format of the multi-station block ACK frame will be described with reference to FIGS. 16 to 18.

Figure 16:
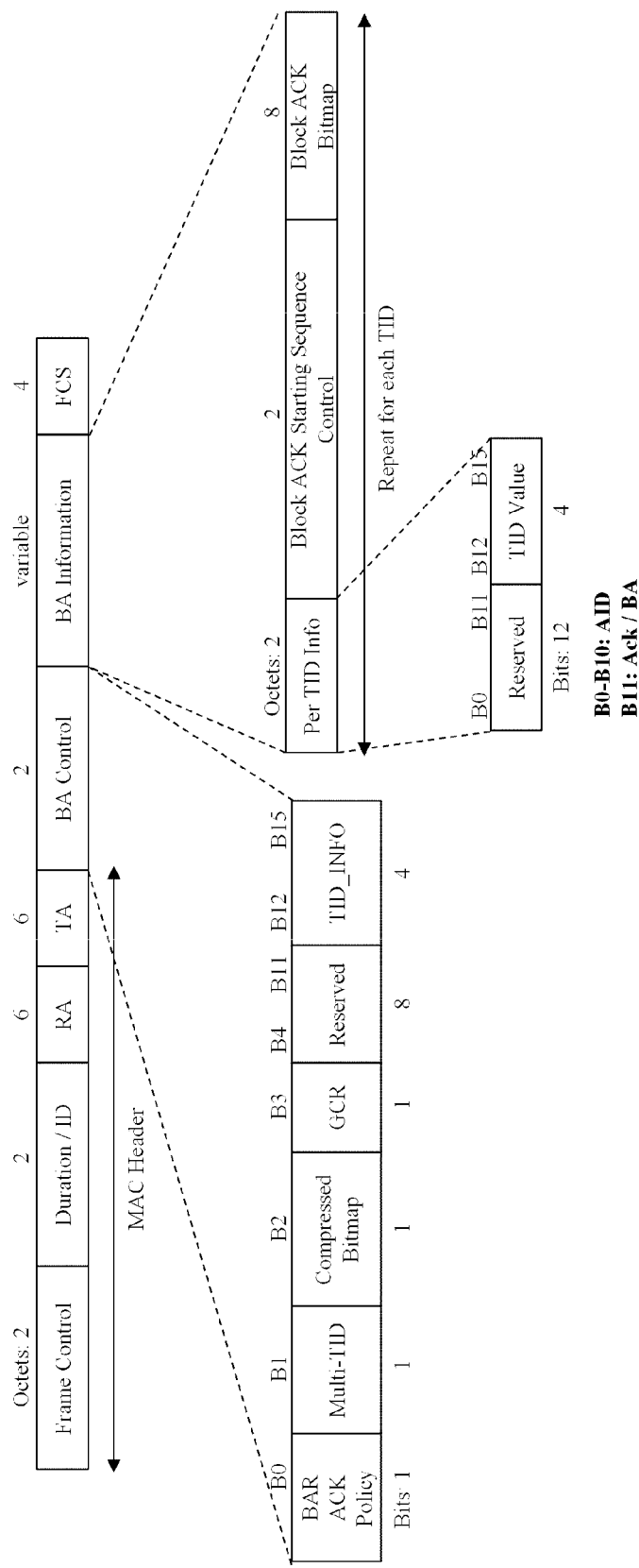
FIG. 16 shows a concrete format of a multi-wireless communication terminal acknowledgment frame indicating whether or not a frame transmitted by a plurality of wireless communication terminals is received.

FIG. 16 shows a concrete format of a multi-wireless communication terminal acknowledgment frame indicating whether or not a frame transmitted by a plurality of wireless communication terminals is received.

The multi-station block ACK frame may indicate whether or not the MAC frame transmitted by each of the plurality of stations is received. Specifically, the multi-station block ACK frame may indicate whether or not to receive the Traffic Identifier (TID) of a MAC frame transmitted by each of a plurality of wireless communication terminals. In addition, the multi-station block ACK frame may indicate whether all the MAC frames included in the MU PPDUs transmitted by the plurality of wireless communication terminals are received.

In addition, the multi-station block ACK frame may identify each of a plurality of wireless communication terminals through an association identifier. At this time, the association identifier may be an AID or a partial AID.

The specific format of the multi-station block ACK frame may be a modification of the format of the multi-TID Block ACK frame of the 802.11 standard.

In a multi-station block ACK frame, the Per TID Info field may include the AID or partial AID of the wireless communication terminal. In a specific embodiment, the field indicating the AID or the partial AID of the wireless communication terminal may be an 11-bit field. In addition, the Per TID Info field may include a field indicating whether all the MAC frames transmitted by the wireless communication terminal are received or not. If the Per TID Info field indicates whether all the MAC frames included in the MU PPDU transmitted by the wireless communication terminal are received, the Block Ack Starting Sequence Control field and the Block Ack Bitmap field may be omitted. In a specific embodiment, the field indicating whether all the MAC frames transmitted by the wireless communication terminal are received may be a 1-bit field.

As described above, the second wireless communication terminal unassociated with the first wireless communication terminal may also transmit the uplink MU PPDU based on the trigger frame. When a second wireless communication terminal unassociated with the first wireless communication terminal transmits an uplink MU PPDU based on a trigger frame, there is a problem that the first wireless communication terminal indicates a second wireless communication terminal unassociated with the first wireless communication terminal in the multi-station block ACK frame. This will be described with reference to FIGS. 17 and 18.

Figure 17:
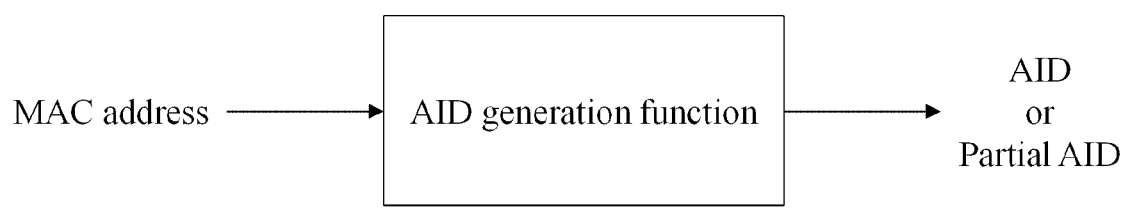
FIG. 17 shows the generation of an identifier for identifying unassociated stations according to an embodiment of the present invention.

FIG. 17 shows the generation of an identifier for identifying unassociated stations according to an embodiment of the present invention.

The first wireless communication terminal may use a specific value as the AID of the second wireless communication terminal unassociated with the first wireless communication terminal in order to identify the second wireless communication terminal unassociated with the first wireless communication terminal. Specifically, the first wireless communication terminal may use a specific value in the multi-station block ACK frame as the AID of the second wireless communication terminal unassociated with the first wireless communication terminal. At this time, the specific value may be a value not assigned by association with the first wireless communication terminal. In addition, the particular value may be referred to as a temporary AID or a temporary partial AID. In addition, the temporary AID may be included in the Per TID Info of the multi-station block ACK frame described above.

The first wireless communication terminal may designate the value of the temporary AID with a value outside the range that the AID is able to be allocated. Specifically, the first wireless communication terminal may designate the value of the temporary AID with a number other than 1 to 2007. Further, the first wireless communication terminal may designate the value of the temporary AID based on the identifier of the second wireless communication terminal. At this time, the identifier of the second wireless communication terminal may be the MAC address of the second wireless communication terminal. In addition, the identifier of the second wireless communication terminal may be an identifier of the second wireless communication terminal used by the second wireless communication terminal when transmitting the uplink MU PPDU. Furthermore, the identifier of the second wireless communication terminal may be a value pre-known to both the first wireless communication terminal and the second wireless communication terminal.

Specifically, the first wireless communication terminal may designate a temporary AID value based on the following equation.

$$\text{Temporary AID} = \text{ID of STA} \% 40 + 2008$$

At this time, the ID of STA indicates the identifier of the second wireless communication terminal. As described above, the identifier of the second wireless communication terminal may be one of the MAC address of the second wireless communication terminal, the identifier of the second wireless communication terminal used by the second wireless communication terminal when transmitting the uplink MU PPDU, and a value pre-known to both the first wireless communication terminal and the second wireless communication terminal.

In another specific embodiment, the Block ACK Bitmap of the multi-station block ACK frame described with reference to FIG. 16 may include the identifier of the second wireless communication terminal. At this time, the Block ACK Bitmap field of the Block ACK frame may indicate that all the MAC frames included in the MU PPDU transmitted by the second wireless communication terminal corresponding to the MAC address are received. At this time, the BA info field may indicate that the Block ACK Bitmap field includes the MAC address. In addition, the multi-station block ACK frame may include a temporary AID in the Per TID Info field and a MAC address value in the Block ACK Bitmap field. At this time, the second wireless communication terminal may determine whether the temporary AID value indicates the second wireless communication terminal through the Block Ack Bitmap field.

Figure 18:
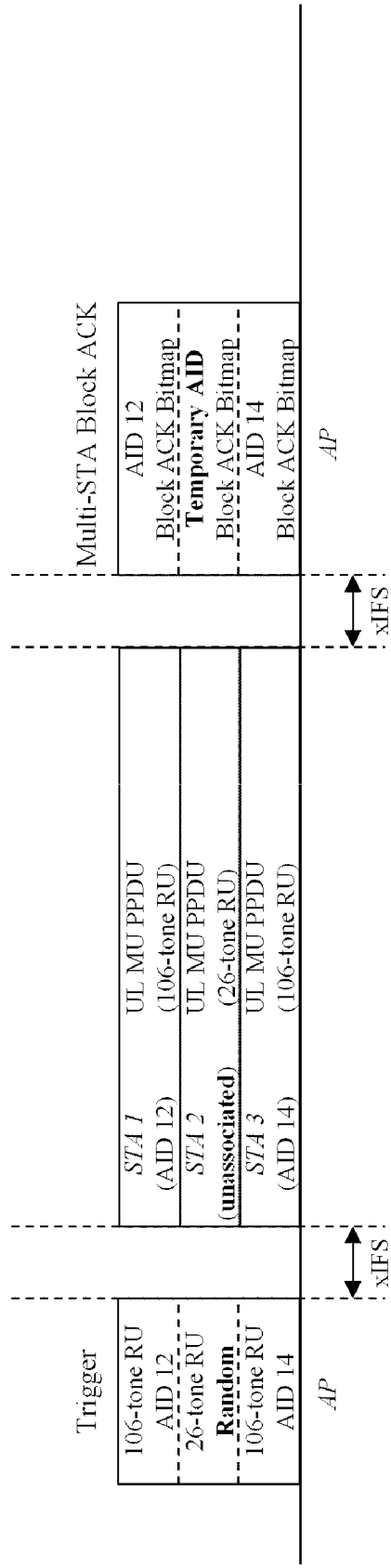
FIG. 18 shows whether or not an access point receives data transmitted by an unassociated station through a multi-wireless communication terminal acknowledgment frame according to an embodiment of the present invention.

FIG. 18 shows whether or not an access point receives data transmitted by an unassociated station through a multi-wireless communication terminal acknowledgment frame according to an embodiment of the present invention.

The first wireless communication terminal may transmit the trigger frame indicating the resource allocated to the specific second wireless communication terminal and the resource allocated to the random access.

At this time, the trigger frame may signal the resource allocated to the specific second wireless communication terminal through the association identifier of the specific second wireless communication terminal.

In addition, the trigger frame may signal resources allocated to a random access through an AID value representing a random access. The AID value representing the random access may be 0 as described above.

The plurality of second wireless communication terminals transmit the uplink MU PPDU to the first wireless communication terminal based on the trigger frame. Specifically, a specific second wireless communication terminal that receives allocated resources through the trigger frame transmits the uplink MU PPDU to the first wireless communication terminal through the allocated resources. In addition, the second wireless communication terminal that does not receive a resource through the trigger frame transmits the uplink MU PPDU through the resources allocated to the random access. At this time, the second wireless communication terminal unassociated with the first wireless communication terminal may also transmit the uplink MU PPDU through the resources allocated to the random access.

The first wireless communication terminal transmits a multi-station block ACK frame similar to the embodiment described with reference to FIGS. 16 and 17. Specifically, whether the MAC frame included in the uplink MU PPDU transmitted by the second wireless communication terminal unassociated with the first wireless communication terminal is received may be signaled through the temporary AID.

In the embodiment of FIG. 18, an access point AP transmits a trigger frame that allocates resources to a specific station and allocates resources for a random access at the same time. Specifically, the trigger frame indicates that two 106-tone RUs are assigned to stations with an AID of 12 and an AID of 14, respectively, and 26-tone RUs are assigned to random access.

The first station STA1 corresponding to an AID 12 transmits the uplink MU PPDU to the access point AP through the 106-tone RU. The third station STA3 corresponding to an AID 14 transmits the uplink MU PPDU to the access point AP through the 106-tone RU.

The second station STA2 unassociated with the access point transmits the uplink MU PPDU to the access point AP through the 26-tone RU.

The access point AP transmits a multi-station block ACK frame Multi-STA Block ACK indicating whether the MAC frame included in the uplink MU PPDU transmitted from the first station STA1 to the third station STA3 is received, to the first to third stations STA1 to STA3. At this time, the multi-station block ACK frame Multi-STA Block ACK indicates whether or not the MAC frame included in the uplink MU PPDU transmitted by the first station STA1 is received through the AID value 12. In addition, the multi-station block ACK frame Multi-STA Block ACK indicates whether or not the MAC frame included in the uplink MU PPDU transmitted by the third station STA3 is received through the AID value 14. In addition, the multi-station block ACK frame Multi-STA Block ACK indicates whether or not the MAC frame included in the uplink MU PPDU transmitted by the third station STA3 is received through the temporary AID.

Figure 19:
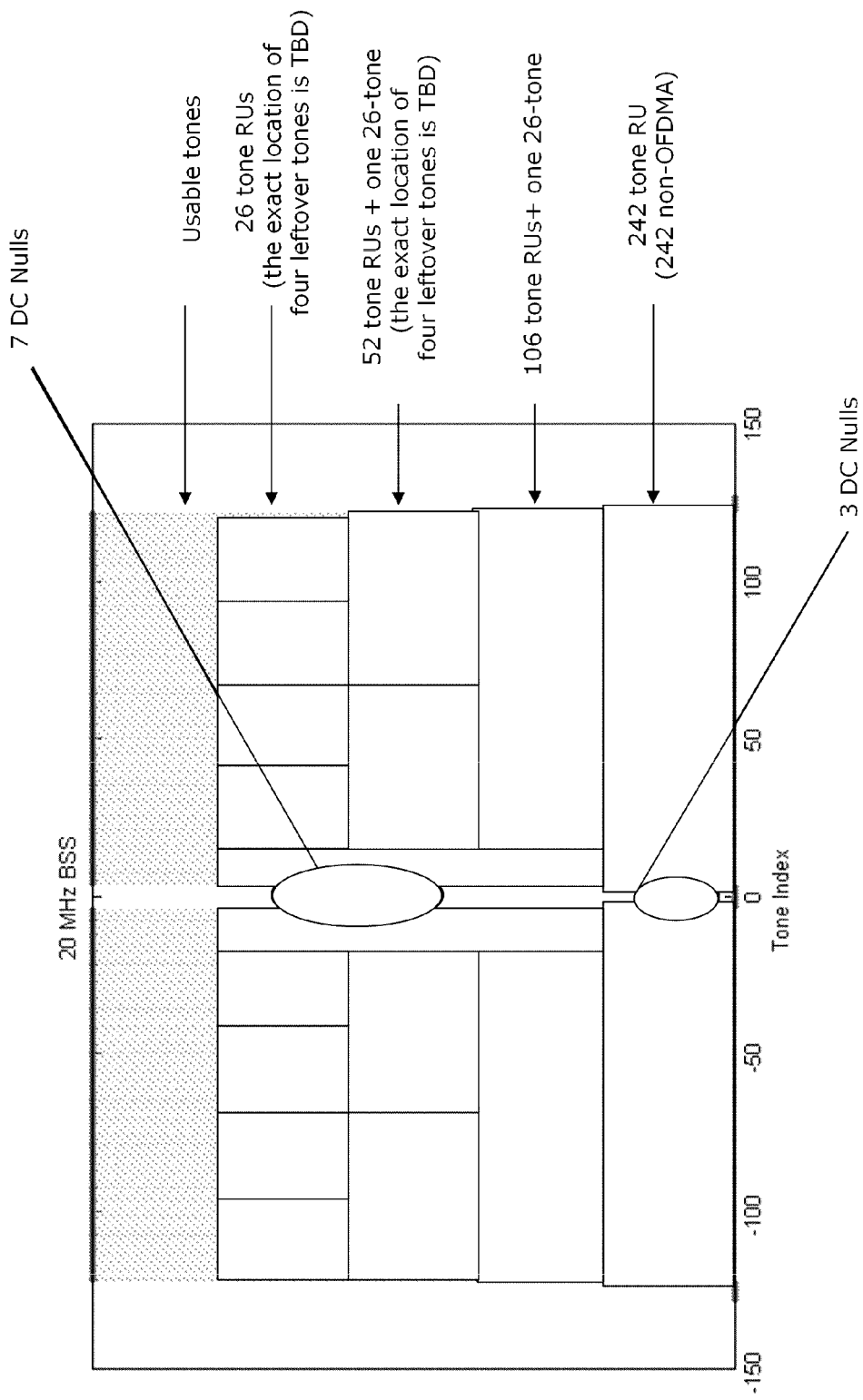
FIG. 19 shows a resource allocation method of a frequency band having a bandwidth of 20 MHz according to an embodiment of the present invention.

FIG. 19 shows a resource allocation method of a frequency band having a bandwidth of 20 MHz according to an embodiment of the present invention.

In OFDM transmission, a plurality of subcarriers transmitted in the frequency band transmit data. In OFDMA transmission, a plurality of sub-frequency bands included in a frequency band are allocated to a plurality of wireless communication terminals, respectively. At this time, a plurality of subcarriers respectively corresponding to the plurality of sub-frequency bands transmit data for the plurality of respective wireless communication terminals. At this time, the subcarrier may be referred to as a tone.

Specifically, the first wireless communication terminal may allocate a frequency band to the second wireless communication terminal using at least one of 26 tones, 52 tones, 106 tones, and 242 tones in a frequency band having a bandwidth of 20 MHz.

Specifically, when a wireless communication terminal performs OFDM transmission in a frequency band having a bandwidth of 20 MHz, the wireless communication terminal may transmit data through 242 tones. At this time, the wireless communication terminal may use 11 guard tones and 3 DC tones.

Also, the wireless communication terminal may use a combination of 26 tones, 52 tones, and 106 tones. At this time, the wireless communication terminal may use 11 guard tones and 7 DC tones. Specifically, the wireless communication terminal may use six 26 tones. Also, the wireless communication terminal may use three 26 tones and three 52 tones. Further, the wireless communication terminal may use two 52 tones, one 26 tones, and one 106 tones. Further, the wireless communication terminal may use one 26 tones and two 106 tones.

Also, the wireless communication terminal may use a combination of 26 tones and 52 tones. At this time, four leftover tones are generated. The leftover tone indicates subcarriers that are not used for data transmission to a specific wireless communication terminal in consideration of transmission efficiency, according to the sub-frequency band allocation method. A method of utilizing the leftover tone will be described with reference to FIGS. 20 to 22.

Figure 20:
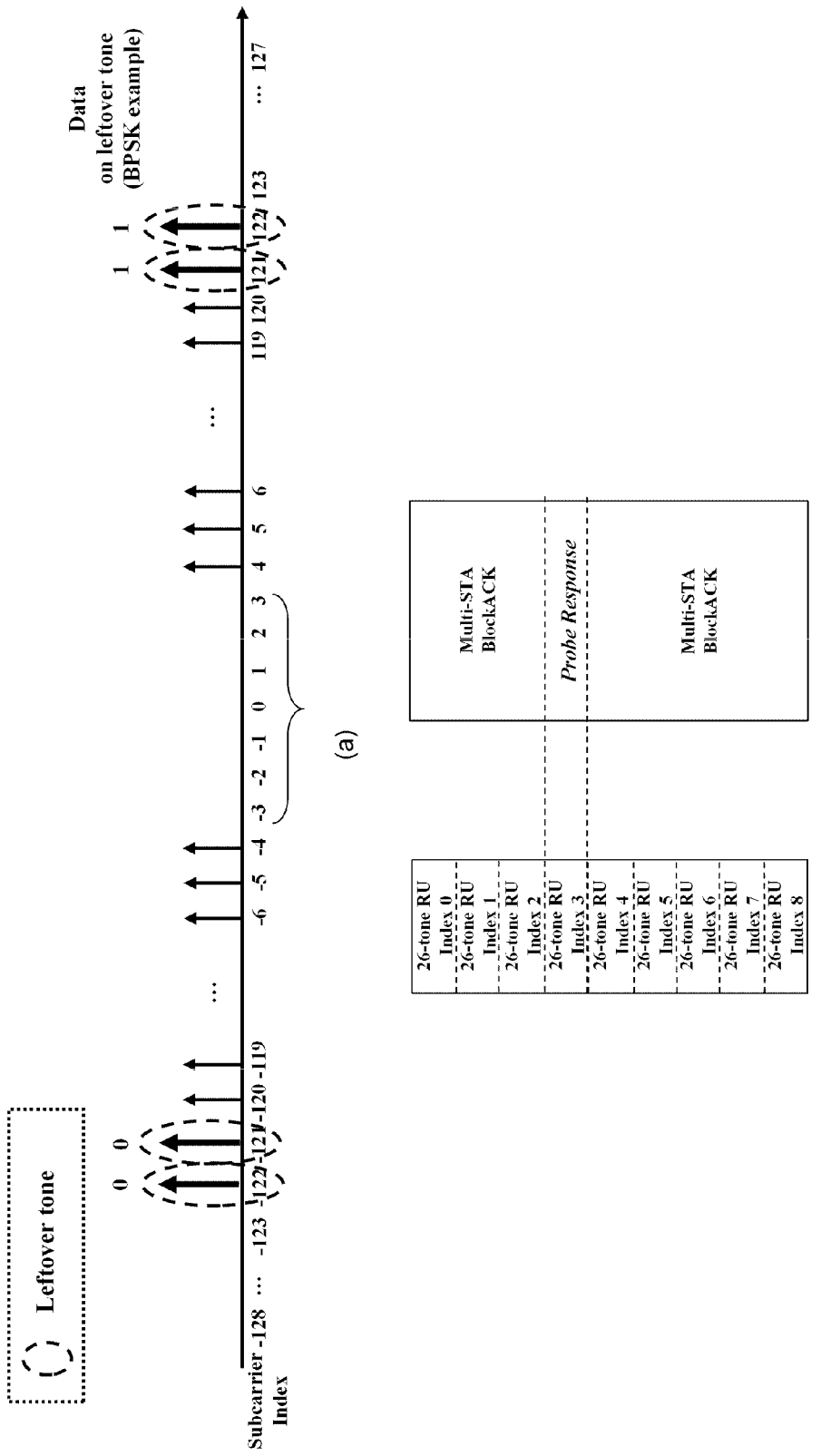
FIG. 20 shows a signaling method using a leftover tone not used for data transmission according to an embodiment of the present invention.
Figure 21:
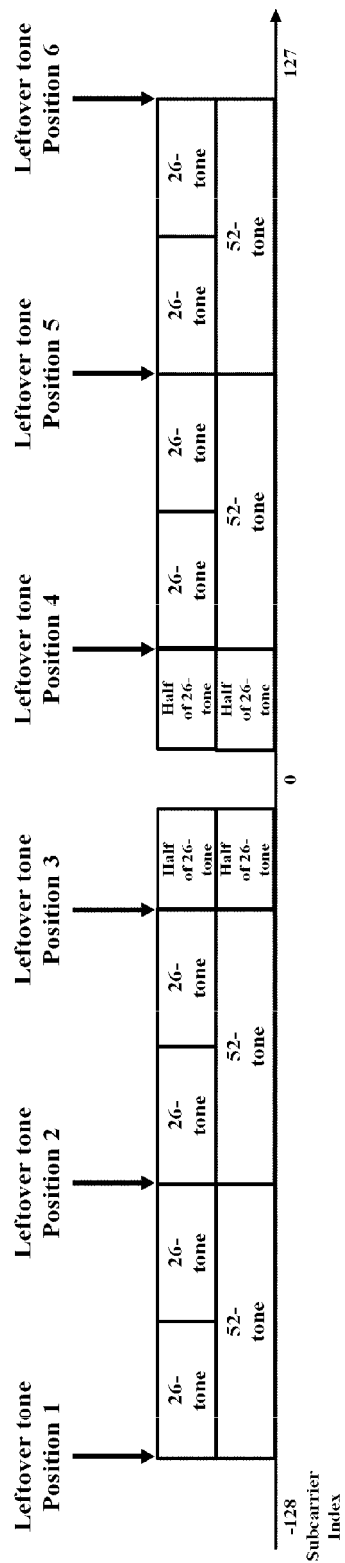
FIG. 21 shows a signaling method using a leftover tone according to another embodiment of the present invention.

FIGS. 20 and 21 show a signaling method using a leftover tone not used for data transmission according to an embodiment of the present invention.

The first wireless communication terminal may indicate a frequency band in which the management frame is located through leftover tones. Specifically, a plurality of leftover tones may indicate an index of an RU where a management frame is located. When a first wireless communication terminal modulates a signal through BPSK, each of a plurality of leftover tones indicates a value of 0 or 1 according to whether a leftover tone transmits a signal, and the combination of the values represented by the leftover tones may signal the position of the management frame. Depending on the modulation method used by the first wireless communication terminal, the range of values that leftover tones are able to represent may vary.

At this time, if the value of the leftover tone is not null, the second wireless communication terminal may recognize that the management frame is transmitted. Also, the second wireless communication terminal may decode the left overtones to acquire information on the frequency band in which the management frame is located. Also, the second wireless communication terminal may recognize the transmission format of the MAC frame in an RU other than RUs in which the management frame is transmitted, using the AID or GID value specified in the HE-SIG field. For example, the second wireless communication terminal may use the AID or GID value specified in the HE-SIG field to recognize which one of a plurality of RUs is utilized for transmission of an MAC frame.

In the embodiment of FIG. 20(a), the four leftover tones have values of 0, 0, 1, and 1, respectively. At this time, the leftover tone indicates that a probe response frame, which is a kind of management frame similar to 20(b), is located in the frequency band whose RU index value corresponds to 3.

In another specific embodiment, the first wireless communication terminal may signal information on the management frame through a combination of the number and position of leftover tones. Specifically, the first wireless communication terminal may signal information on the management frame through a combination of the number and position of leftover tones. At this time, the leftover tone may be located symmetrically. This is to reduce the PAPR.

In the embodiment of FIG. 21, the leftover tone may be located at each of six positions as shown in FIG. 21(a). At this time, when the leftover tones are symmetrically located, the combination of the positions and the numbers of the leftover tones is a total of six as shown in FIG. 21(b). Therefore, the leftover tone may signal the positions of six different types of management frames. At this time, the position of the management frame signaled by the leftover tone may be the index value of the RU where the management frame is located.

Figure 22:
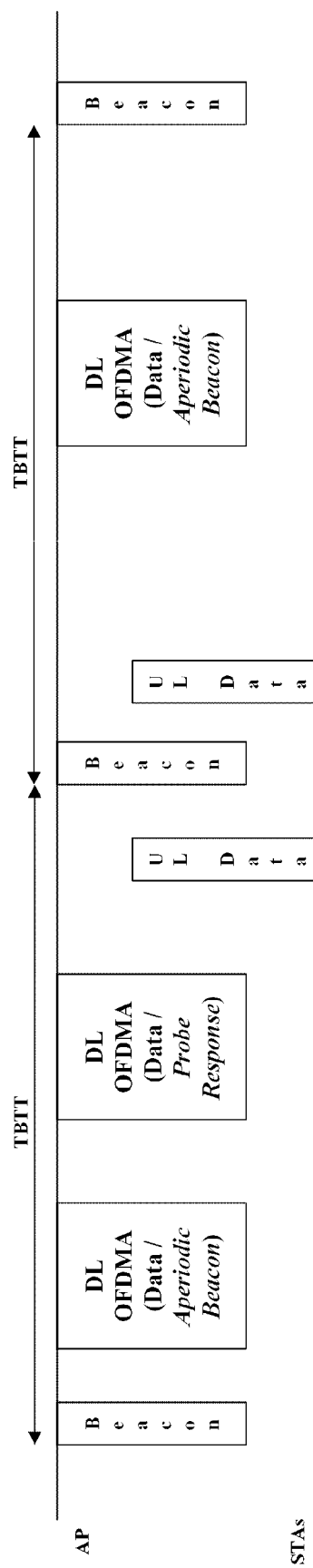
FIG. 22 shows an access point transmitting a management frame according to an embodiment of the present invention.

FIG. 22 shows an access point transmitting a management frame according to an embodiment of the present invention.

The first wireless communication terminal may transmit the management frame while transmitting the data frame. Specifically, the first wireless communication terminal may transmit the data frame and the management frame together through OFDMA. Specifically, the first wireless communication terminal may transmit a management frame through the remaining resource after allocating a resource to the second wireless communication terminal that is to transmit the downlink MU PPDU during OFDMA. Also, the first wireless communication management frame may be transmitted aperiodically. At this time, the first wireless communication terminal may signal the position of the management frame similar to the embodiment described with reference to FIGS. 20 and 21.

In a specific embodiment, the management frame may represent a broadcast frame. Specifically, the management frame may represent at least one of a beacon frame and a probe response frame.

In the embodiment of FIG. 22, the access point AP periodically transmits a beacon frame. At this time, the access point AP transmits the beacon frame together aperiodically while transmitting the data frame to the plurality of stations. In addition, the access point AP transmits a probe response frame while transmitting a data frame to a plurality of stations.

Through such an operation, the first wireless communication terminal may reduce the number of contention procedures for transmitting the management frame. Accordingly, the second wireless communication terminal may quickly scan the first wireless communication terminal and be associated with the first wireless communication terminal. Specifically, in a situation where many wireless communication terminals exist in a narrow area, the second wireless communication terminal may scan the first wireless communication terminal and reduce the time associated with the first wireless communication terminal.

As described above, when a plurality of second wireless communication terminals use OFDMA, the plurality of second wireless communication terminals may transmit the management frame and the data frame together to the first wireless communication terminal. This will be described in detail with reference to FIGS. 23 to 29.

Figure 23:
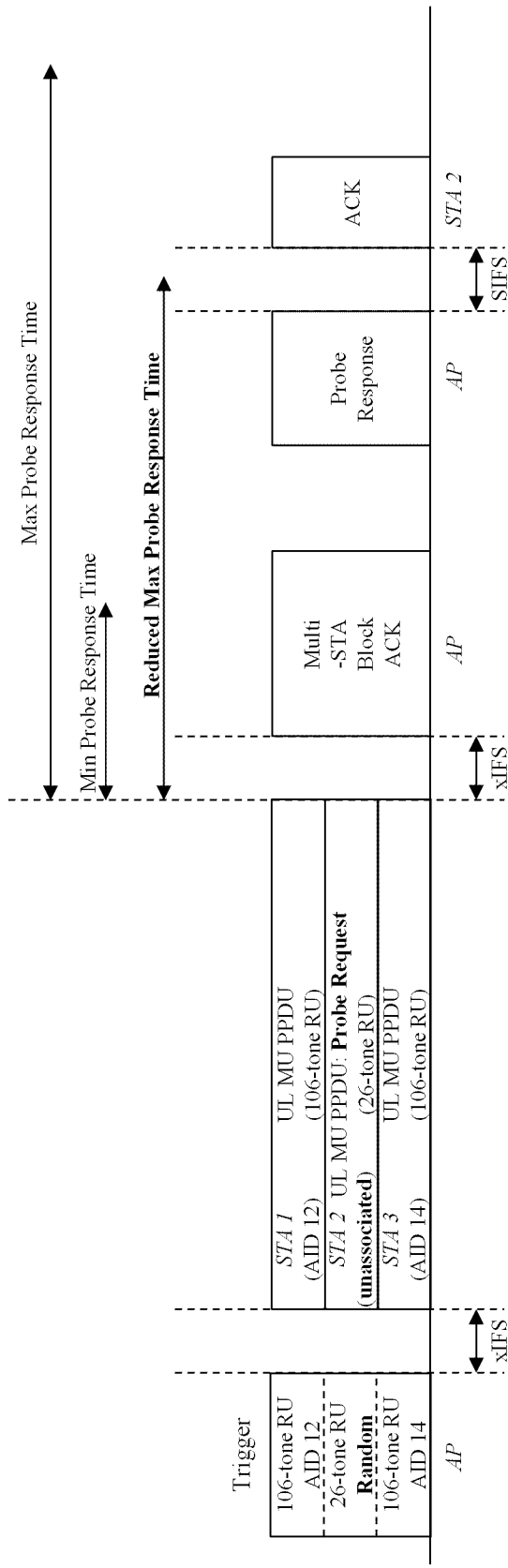
FIG. 23 shows that a station according to an embodiment of the present invention transmits a probe request frame to an access point unassociated with a station based on a trigger frame.

FIG. 23 shows that a station according to an embodiment of the present invention transmits a probe request frame to an access point unassociated with a station based on a trigger frame.

In general, when the second wireless communication terminal receives a probe response frame within Min Probe Response Time from the time when transmitting the probe request frame, the second wireless communication terminal waits Max Probe Response Time from the time when transmitting the probe request frame. When Max Probe Response Time elapses from the time when the probe request frame is transmitted, the second wireless communication terminal processes all the received probe response frames. The second wireless communication terminal associates with the first wireless communication terminal based on the probe response frame received first through this operation to prevent the case where the wireless communication terminal is not be associated with the optimal first wireless communication terminal.

However, when the second wireless communication terminal transmits the probe request based on the trigger frame, the second wireless communication terminal specifies the first wireless communication terminal and transmits the probe request. Therefore, the second wireless communication terminal may process the probe response frame within a time shorter than Max Probe Response Time from the time when the probe response frame is received. For example, the second wireless communication terminal may process the probe response frame as soon as it receives the probe response frame.

In the embodiment of FIG. 23, the second station transmits a probe request frame to the access point AP based on the trigger frame. Specifically, the second station transmits a probe request frame to the access point AP through the 26-tone RU allocated for the random access indicated by the trigger frame.

The access point AP transmits a multi-station block ACK frame Multi-STA Block ACK indicating whether the MAC frame included in the uplink MU PPDU transmitted from the first station STA1 and the third station STA3 is received, to the first and third stations STA1 to STA3.

Then, the access point AP transmits a probe response frame to the second station STA2.

The second station STA2 transmits an ACK frame for the probe response frame to the access point AP within a time shorter than Max Probe Response Time.

Figure 24:
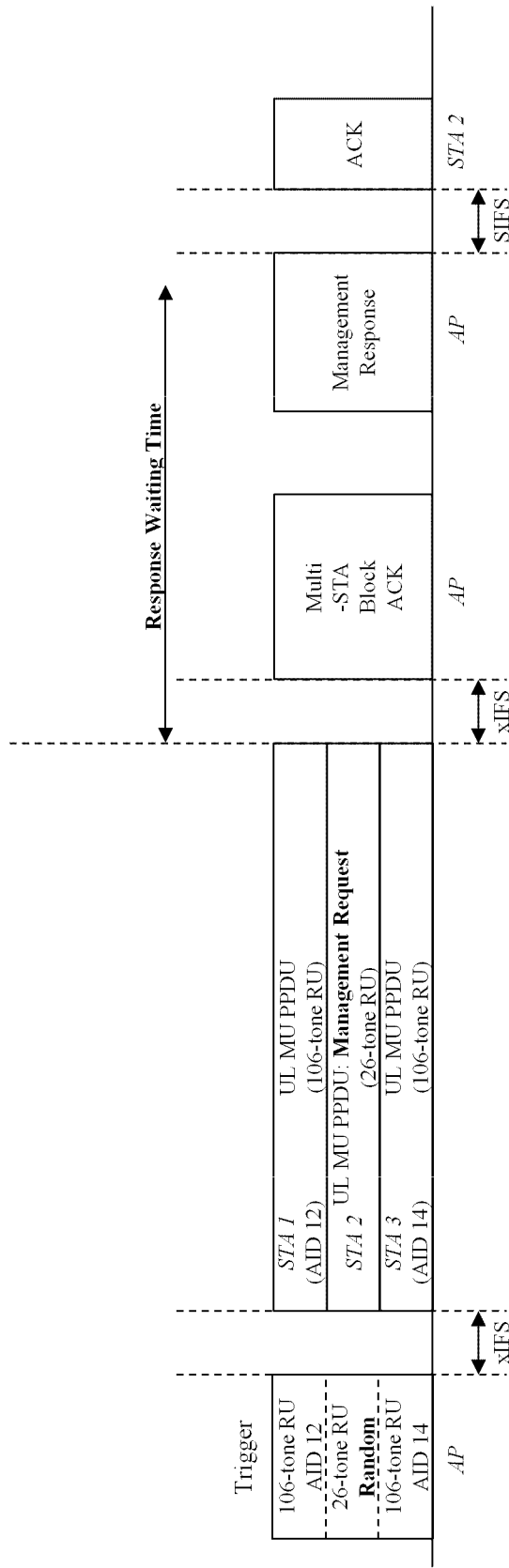
FIG. 24 shows that a station according to an embodiment of the present invention transmits a management frame to an access point unassociated with a station based on a trigger frame.

FIG. 24 shows that a station according to an embodiment of the present invention transmits a management frame to an access point unassociated with a station based on a trigger frame.

When a plurality of second wireless communication terminals transmit a data frame and a management frame together to the first wireless communication terminal, the first wireless communication terminal transmits an ACK frame for data frame transmission and transmits a response to the management frame. Therefore, when the plurality of second wireless communication terminals transmit the data frame and the management frame together to the first wireless communication terminal, the time when the second wireless communication terminal receives the response to the management frame may be slower than the case where the second wireless communication terminal alone transmits the management frame.

Therefore, when the plurality of second wireless communication terminals transmit the data frame and the management frame together to the first wireless communication terminal, the second wireless communication terminal may wait the response to the management frame for a time longer than the response time for a general management frame.

As described with reference to FIGS. 23 and 24, when the plurality of second wireless communication terminals transmit the data frame and the management frame together to the first wireless communication terminal, the time when the second wireless communication terminal receives the response to the management frame may be slower than the case where the second wireless communication terminal alone transmits the management frame. Therefore, there is a need for a method through which the second wireless communication terminal may quickly receive a response to the management frame. This will be described with reference to FIGS. 25 and 26.

Figure 25:
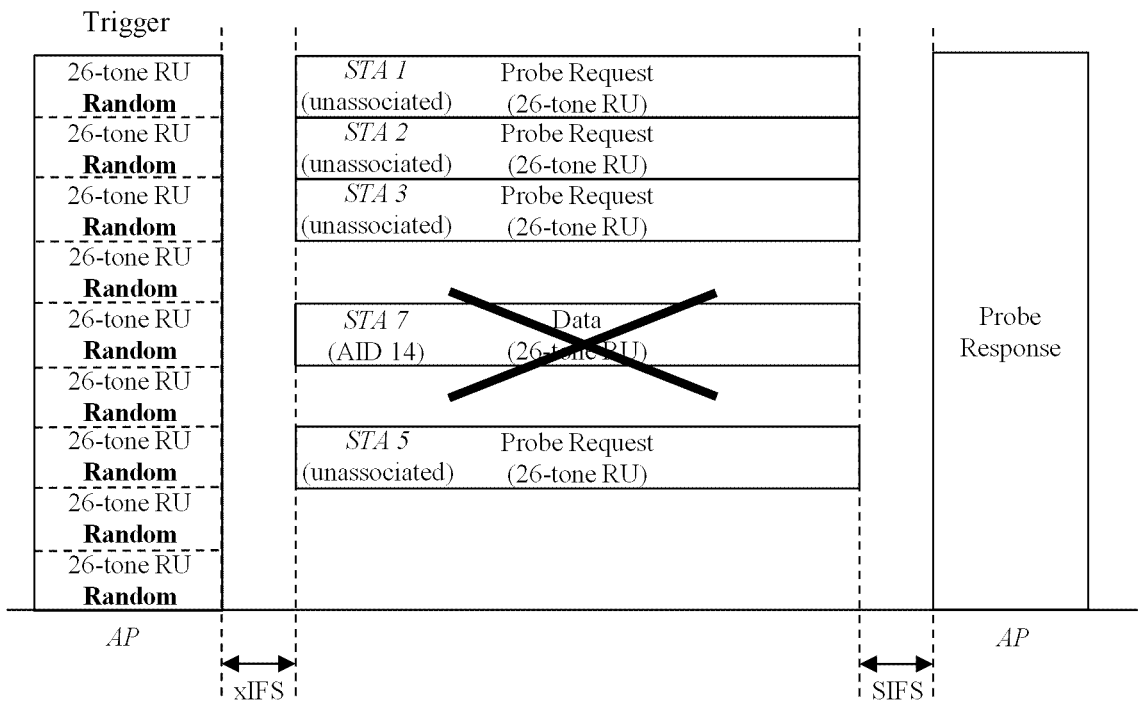
FIG. 25 shows that an access point transmits a probe response frame after receiving a probe request frame from a plurality of stations according to an embodiment of the present invention.

FIG. 25 shows that an access point transmits a probe response frame after receiving a probe request frame from a plurality of stations according to an embodiment of the present invention.

When the first wireless communication terminal and the plurality of second wireless communication terminals transmit a data frame and a management frame together and the first wireless communication terminal fails to receive a data frame transmitted by the second wireless communication terminal due to a transmission collision or the like, the first wireless communication terminal may transmit a response to the management frame without transmitting the ACK frame for the data frame.

In the embodiment of FIG. 25, an access point AP transmits a trigger frame indicating a resource allocation for a random access.

The first station STA1 to the third station STA3 and the fifth station STA5 transmit the probe request frame to the access point AP based on the trigger frame.

The seventh station STA7 transmits the data frame to the access point AP based on the trigger frame. However, due to a transmission collision, the access point AP does not receive the data frame transmitted by the seventh station STA7.

The access point AP transmits the probe response frame to the first station STA1 to the third station STA3, and the fifth station STA5.

Figure 26:
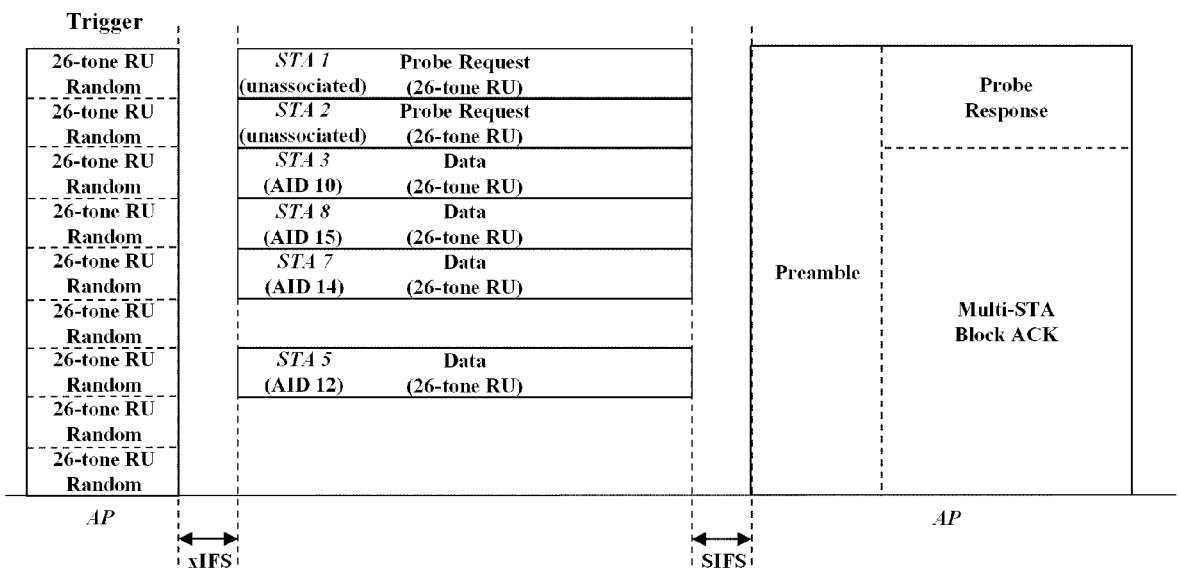
FIG. 26 shows that an access point according to an embodiment of the present invention receives a probe request frame and a data frame from a plurality of stations, and then transmits an ACK frame for a probe response frame and a data frame together.

FIG. 26 shows that an access point according to an embodiment of the present invention receives a probe request frame and a data frame from a plurality of stations, and then transmits an ACK frame for a probe response frame and a data frame together.

The first wireless communication terminal may transmit a response to the data frame and a response to the management frame together. Specifically, when a plurality of second wireless communication terminals transmit a data frame and a management frame together, the first wireless communication terminal may transmit a response to the data frame and a response to the management frame together. At this point, the response to the data frame may be an ACK frame indicating whether the data frame is received or not. Specifically, the response to the data frame may be the multi-station block ACK frame described above.

In a specific embodiment, the first wireless communication terminal may transmit a response to the data frame and a response to the management frame together through OFDMA. In another specific embodiment, the first wireless communication terminal may transmit a response to the data frame and a response to the management frame together through one Aggregate MPDU (A-MPDU). At this time, the size of at least one of frequency bands used by the response to the data frame and the response to the management frame may be fixed. In yet another embodiment, the size of at least one of frequency bands used by the response to the data frame and the response to the management frame may be variable.

Further, when the trigger frame includes the same information as the management frame, the management frame may omit information included in the trigger frame. Specifically, when the management frame is a probe request frame, the probe response frame may omit information on the operating channel since the trigger frame includes information on the operating channel. In addition, the probe response frame may omit at least one of information on the maximum MPDU count, information on the frequency bandwidth, information on the guard interval, information on the device capability such as whether STBC is supported, a time stamp, information on transmission rate, and information on the power constraint.

In the embodiment of FIG. 26, an access point AP transmits a trigger frame indicating a resource allocation for a random access.

The first station STA1 to the second station STA2 transmit the probe request frame to the access point AP based on the trigger frame.

The third station STA3, the fifth station STA5, the seventh station STA7, and the eighth station STA8 transmit the data frame to the access point AP based on the trigger frame.

The access point AP transmits a multi-station block ACK frame for a probe response frame for the first station STA1 to the second station STA2 and a data frame transmitted by the third station STA3, the fifth station STA5, the seventh station STA7, and the eighth station STA8 through OFDMA.

The first wireless communication terminal may reduce the time and transmission resources required for transmission of the response to the management frame through this operation.

As described above, the second wireless communication terminal unassociated with the first wireless communication terminal may transmit the management frame to the first wireless communication terminal based on the trigger frame. At this time, the management frame may include at least one of a probe request frame, an association request frame, and a reassociation request frame. In addition, the first wireless communication terminal may use a minimum unit frequency bandwidth or more. The minimum unit frequency bandwidth represents the smallest frequency bandwidth that the first wireless communication terminal may use. In a specific embodiment, the minimum unit frequency bandwidth may be 20 MHz.

At this time, when the first wireless communication terminal uses the minimum unit frequency bandwidth, it is a problem that which frequency band the second wireless communication terminal unassociated with the first wireless communication terminal should receive the response to the management frame. For example, the first wireless communication terminal may use a frequency band having a bandwidth of 80 MHz, and the second wireless communication terminal unassociated with the first wireless communication terminal may transmit the management frame through the sub-frequency band having a bandwidth of 20 MHz based on the trigger frame. At this time, the first wireless communication terminal has a problem that which sub-frequency band of the 80 MHz bandwidth the response to the management frame is transmitted over. This is because, if there is no rule for a particular sub-frequency band, the second wireless communication terminal needs to sense the entire frequency band.

A method for transmitting a response to a management frame to a second wireless communication terminal unassociated with a first wireless communication terminal when the first wireless communication terminal uses more than the minimum unit frequency bandwidth will be described with reference to FIGS. 27 to 29.

Figure 27:
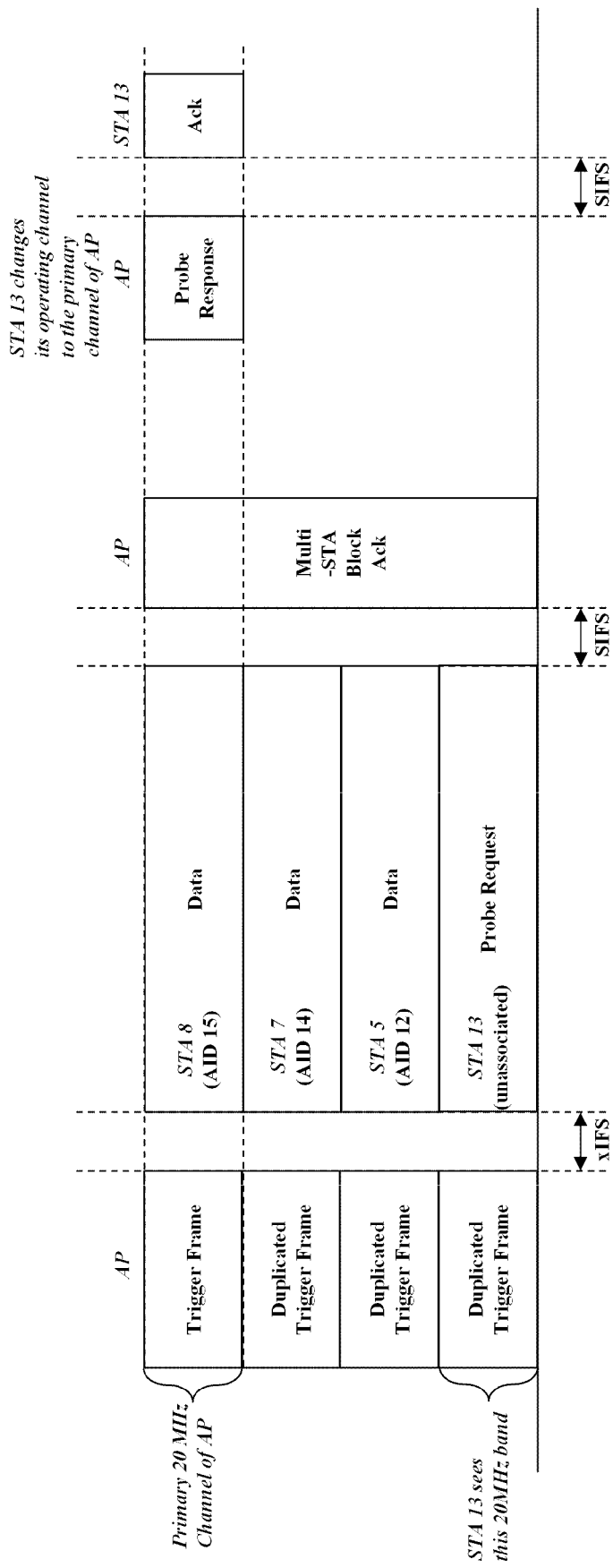
FIG. 27 shows that a station according to an embodiment of the present invention transmits a probe request frame based on a trigger frame to an access point using a frequency band having a frequency bandwidth of 80 MHz and the access point transmits a probe response frame through a primary channel.

FIG. 27 shows that a station according to an embodiment of the present invention transmits a probe request frame based on a trigger frame to an access point using a frequency band having a frequency bandwidth of 80 MHz and the access point transmits a probe response frame through a primary channel.

When the first wireless communication terminal uses a frequency band having a frequency bandwidth larger than the minimum unit frequency bandwidth, the first wireless communication terminal may transmit the same trigger frame every minimum unit frequency bandwidth unit. In yet another specific embodiment, the first wireless communication terminal may transmit the trigger frame using the entire frequency bandwidth.

When the second wireless communication terminal unassociated with the first wireless communication terminal transmits the management frame to the first wireless communication terminal based on the trigger frame, the first wireless communication terminal may transmit the management frame through the predetermined sub-frequency band. At this time, the predetermined sub-frequency band may be a primary channel. At this time, the second wireless communication terminal may acquire information on the primary channel from the trigger frame. In another specific embodiment, the second wireless communication terminal may acquire information on the primary channel from the beacon frame.

Specifically, the second wireless communication terminal may transmit the management frame to the first wireless communication terminal, and search for the designated sub-frequency band to which the response to the management frame is transmitted. At this time, if the second wireless communication terminal does not receive a response to the management frame for a predetermined time, the second wireless communication terminal may search for the sub-frequency band that transmits the management frame. In another specific embodiment, the second wireless communication terminal may transmit the management frame to the first wireless communication terminal, and search for a channel included in a frequency band from the designated sub-frequency band to which the response to the management frame is transmitted.

In the embodiment of FIG. 27, the access point AP transmits the same trigger frame in units of 20 MHz in a frequency band having an 80 MHz bandwidth. At this time, the trigger frame may indicate a frequency band allocated for random access.

The thirteenth station STA13 unassociated with the access point AP receives the trigger frame through the fourth channel.

The eighth station STA8, the seventh station STA7, and the fifth station STA5 transmit the data frame to the access point AP based on the trigger frame. At this time, the thirteenth station STA13 transmits the probe request frame through the channel that receives the trigger frame.

The access point AP transmits a multi-station block ACK frame Multi-STA Block ACK indicating whether a data frame transmitted by the eighth STA 8, the seventh station STA7, and the fifth station STA5 is received, to the eighth station STA8, the seventh station STA7, and the fifth station STA5.

The access point AP transmits the probe response frame to the thirteenth station STA13 through the first channel, which is the primary channel.

The thirteenth station STA13 transmits an ACK frame for the probe response frame through the first channel, which is a primary channel.

Figure 28:
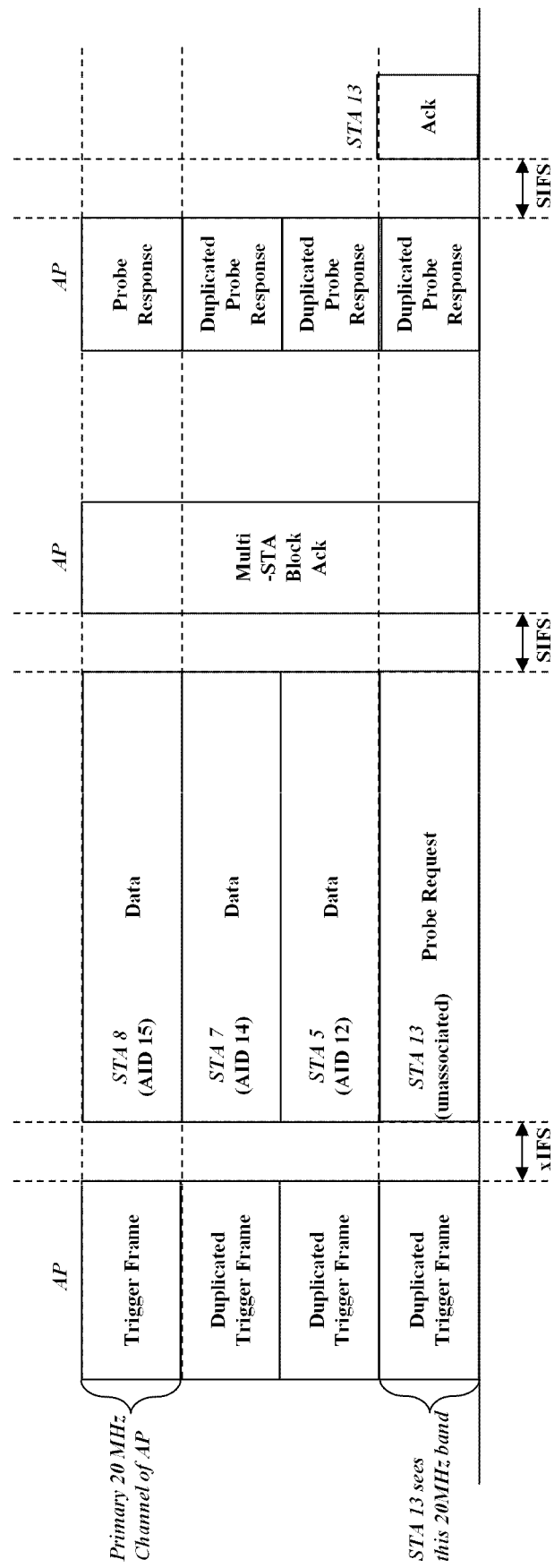
FIG. 28 shows that a station according to an embodiment of the present invention transmits a probe request frame based on a trigger frame to an access point using a frequency band having a frequency bandwidth of 80 MHz and the access point transmits the same probe response frame in 20 MHz frequency bandwidth units.

FIG. 28 shows that a station according to an embodiment of the present invention transmits a probe request frame based on a trigger frame to an access point using a frequency band having a frequency bandwidth of 80 MHz and the access point transmits the same probe response frame in 20 MHz frequency bandwidth units.

When the second wireless communication terminal unassociated with the first wireless communication terminal transmits the management frame to the first wireless communication terminal based on the trigger frame, the first wireless communication terminal may transmit the same management frame every minimum unit frequency bandwidth. At this time, the management frame may be a unicast management frame for the second wireless communication terminal. In yet another specific embodiment, the management frame may be a multicast management frame or a broadcast management frame for the second wireless communication terminal as well as other wireless communication terminals. The first wireless communication terminal may transmit the management frame to the wireless communication terminal other than the second wireless communication terminal through a multicast management frame or a broadcast management frame without a separate contention procedure.

The second wireless communication terminal may transmit a response to the management frame transmitted by the first wireless communication terminal through the sub-frequency band in which the management frame is transmitted. At this time, the first wireless communication terminal may search for the sub-frequency band to which the second wireless communication terminal transmits the management frame to receive the response to the management frame transmitted by the first wireless communication terminal from the second wireless communication terminal. In another specific embodiment, when the second wireless communication terminal does not transmit the management frame through the designated sub-frequency band, since the first wireless communication terminal may not know through which sub-frequency band the second wireless communication terminal will transmit the management frame, the first wireless communication terminal may search the entire frequency band.

In the embodiment of FIG. 28, the access point AP transmits the same trigger frame in units of 20 MHz in a frequency band having an 80 MHz bandwidth.

The thirteenth station STA13 unassociated with the access point AP receives the trigger frame through the fourth channel. At this time, the trigger frame may indicate a frequency band allocated for random access.

The eighth station STA8, the seventh station STA7, and the fifth station STA5 transmit the data frame to the access point AP based on the trigger frame. At this time, the thirteenth station STA13 transmits the probe request frame through the channel that receives the trigger frame.

The access point AP transmits a multi-station block ACK frame Multi-STA Block ACK indicating whether a data frame transmitted by the eighth STA 8, the seventh station STA7, and the fifth station STA5 is received, to the eighth station STA8, the seventh station STA7, and the fifth station STA5.

The access point AP transmits the same probe response frame to the thirteenth station STA13 in units of 20 MHz in the frequency band having the bandwidth of 80 MHz.

The thirteenth station STA13 transmits an ACK frame for the probe response frame through the fourth channel transmitting the probe request frame to the access point AP.

Figure 29:
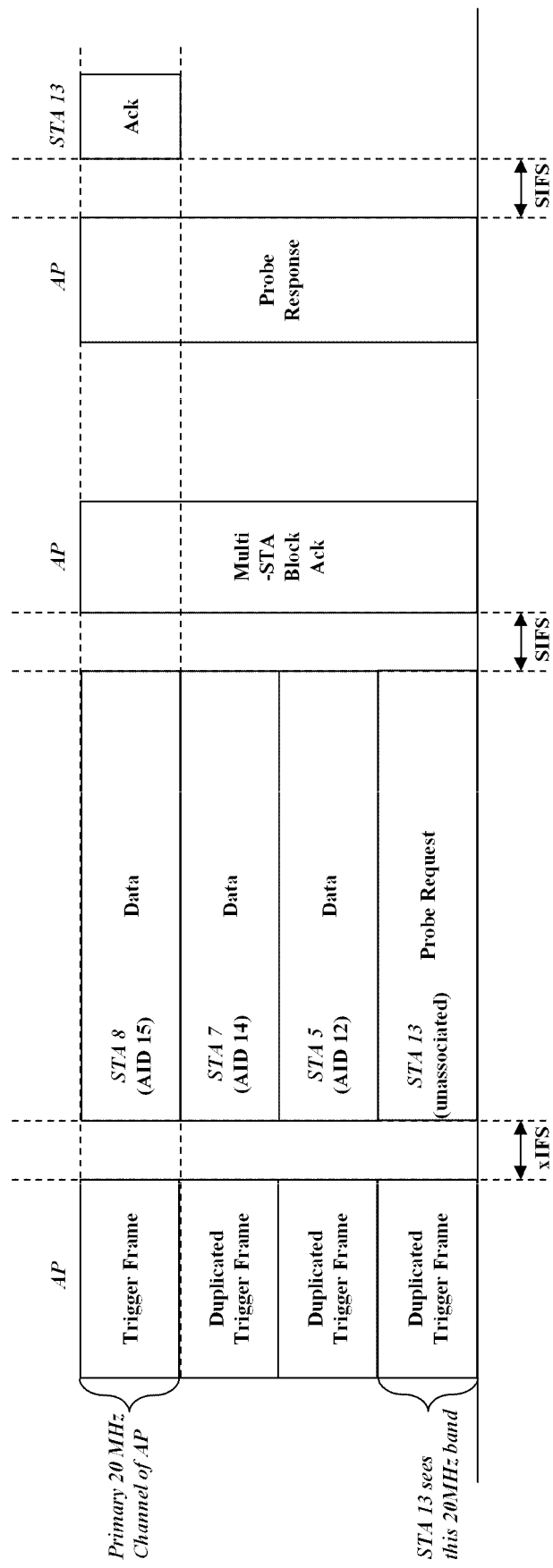
FIG. 29 shows that a station according to an embodiment of the present invention transmits a probe request frame based on a trigger frame to an access point using a frequency band having a frequency bandwidth of 80 MHz and the access point transmits a probe response frame through the entire frequency band.

FIG. 29 shows that a station according to an embodiment of the present invention transmits a probe request frame based on a trigger frame to an access point using a frequency band having a frequency bandwidth of 80 MHz and the access point transmits a probe response frame through the entire frequency band.

When the second wireless communication terminal unassociated with the first wireless communication terminal transmits the management frame to the first wireless communication terminal based on the trigger frame, the first wireless communication terminal may transmit the management frame through the entire frequency band used by the first wireless communication terminal. At this time, the management frame may be a unicast management frame for the second wireless communication terminal. In yet another specific embodiment, the management frame may be a multicast management frame or a broadcast management frame for the second wireless communication terminal as well as other wireless communication terminals. The first wireless communication terminal may transmit the management frame to the wireless communication terminal other than the second wireless communication terminal through a multicast management frame or a broadcast management frame without a separate contention procedure.

The second wireless communication terminal may acquire information on the frequency band used by the first wireless communication terminal from the trigger frame. Specifically, the second wireless communication terminal may acquire information on the channel used by the first wireless communication terminal and information on the frequency bandwidth from the trigger frame.

In the embodiment of FIG. 29, the access point AP transmits the same trigger frame in units of 20 MHz in a frequency band having an 80 MHz bandwidth. At this time, the trigger frame may indicate a frequency band allocated for random access.

The thirteenth station STA13 unassociated with the access point AP receives the trigger frame through the fourth channel.

The eighth station STA8, the seventh station STA7, and the fifth station STA5 transmit the data frame to the access point AP based on the trigger frame. At this time, the thirteenth station STA13 transmits the probe request frame through the channel that receives the trigger frame.

The access point AP transmits a multi-station block ACK frame Multi-STA Block ACK indicating whether a data frame transmitted by the eighth STA 8, the seventh station STA7, and the fifth station STA5 is received, to the eighth station STA8, the seventh station STA7, and the fifth station STA5.

The access point AP transmits the probe response frame to the thirteenth station STA13 through the entire frequency band having the bandwidth of 80 MHz.

The thirteenth station STA13 transmits an ACK frame for the probe response frame through the first channel, which is a primary channel.

Figure 30:
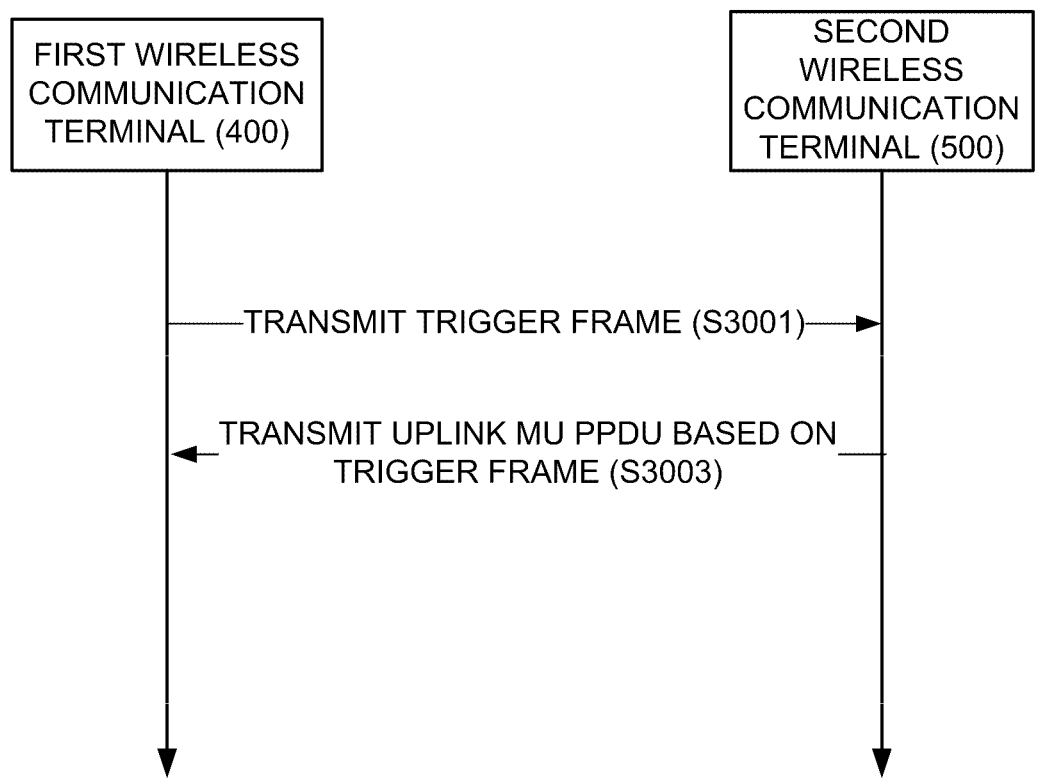
FIG. 30 is a flowchart illustrating operations of a first wireless communication terminal and a second wireless communication terminal according to an embodiment of the present invention.

FIG. 30 is a flowchart illustrating operations of a first wireless communication terminal and a second wireless communication terminal according to an embodiment of the present invention.

The first wireless communication terminal 400 transmits a trigger frame indicating information on resources allocated by the first wireless communication terminal 400 to the second wireless communication terminal 500 (S3001). Specifically, the trigger frame may represent a resource allocated for random access. In a specific embodiment, the trigger frame may indicate a frequency band allocated for random access through a specific value of the AID. At this time, the specific value of the AID may be 0. The specific format of the trigger frame may be the same as the embodiment described with reference to FIG. 6 to FIG. 10.

The second wireless communication terminal 500 transmits the uplink MU PPDU to the first wireless communication terminal 400 based on the trigger frame (S3003). Not only the second wireless communication terminal 500 associated with the first wireless communication terminal 400 but also the second wireless communication terminal 500 unassociated with the first wireless communication terminal 400 also transmits the uplink MU PPDU based on the trigger frame. As described above, a leftover tone may be used to signal information on a management frame to the second wireless communication terminal 500 unassociated with the first wireless communication terminal 400.

In addition, the first wireless communication terminal 400 may use the temporary AID to indicate information on the second wireless communication terminal 500 unassociated with the first wireless communication terminal 400. At this time, the value of the temporary AID is a value that is not allocated by association with the first wireless communication terminal 400. The first wireless communication terminal 400 may assign the value of the temporary AID with a value outside the range that the AID is able to be allocated. Specifically, the first wireless communication terminal 400 may assign the value of the temporary AID with a number other than 1 to 2007. Further, the first wireless communication terminal 400 may designate the value of the temporary AID based on the identifier of the second wireless communication terminal 500. At this time, the identifier 500 of the second wireless communication terminal may be the MAC address of the second wireless communication terminal 500. In addition, the identifier of the second wireless communication terminal 500 may be an identifier of the second wireless communication terminal 500 used by the second wireless communication terminal 500 when transmitting the uplink MU PPDU. Furthermore, the identifier of the second wireless communication terminal 500 may be a value pre-known to both the first wireless communication terminal 400 and the second wireless communication terminal 500.

Specifically, the first wireless communication terminal 400 may designate a temporary AID value based on the following equation.

$$\text{Temporary AID} = \text{ID of STA} \% 40 + 2008$$

A specific embodiment of the second wireless communication terminal 500 unassociated with the first wireless communication terminal 400 may be similar to the embodiment described with reference to FIGS. 16 to 22.

The second wireless communication terminal 500 may transmit at least one of the data frame, the management frame, and the BSR to the first wireless communication terminal 400 based on the trigger frame. Specifically, the second wireless communication terminal 500 may transmit the BSR based on a trigger frame indicating a frequency band for random access.

In addition, a plurality of second wireless communication terminals 500 may multiplex different types of MAC frames in the frequency domain using OFDMA transmission and transmit the MAC frames to the first wireless communication terminal 400. For example, the data frame transmission of one of the second wireless communication terminals 500 and the management frame transmission of another second wireless communication terminal 500 may be multiplexed in the frequency domain through OFDMA.

In addition, the second wireless communication terminal 500 may transmit the management frame to the first wireless communication terminal 400 based on the trigger frame. At this time, the operation of the first wireless communication terminal 400 and the second wireless communication terminal 500 may be the same as those of the embodiment of FIGS. 26 to 30.

There may be a plurality of MU PPDU transmissions between the first wireless communication terminal 400 and the second wireless communication terminal 500 during one TXOP. Specifically, the downlink MPDU transmission of the first wireless communication terminal 400 and the uplink MPDU transmission of the second wireless communication terminal 500 may be performed in one TXOP using the trigger frame. At this time, the specific operations of the first wireless communication terminal 400 and the second wireless communication terminal 500 may be similar to the those described with reference to FIGS. 11 to 15.

As described above, the management frame may omit the information overlapping with the trigger frame. Specifically, the probe response frame may omit the information overlapping the trigger frame or the beacon frame. For example, the probe response frame may omit information on the operating channel. In addition, the probe response frame may omit at least one of information on the maximum MPDU count, information on the frequency bandwidth, information on the guard interval, information on the device capability such as whether STBC is supported, a time stamp, information on transmission rate, and information on the power constraint.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A base wireless communication terminal communicating with a wireless communication terminal wirelessly, the base wireless communication terminal comprising:
   a transceiver; and
   a processor,
   wherein the processor is configured to:
   receive, by using the transceiver, a medium access control (MAC) frame transmitted from the wireless communication terminal,
   when the wireless communication terminal is unassociated with the base wireless communication terminal, insert an identifier for an unassociated wireless communication terminal and a MAC address of the wireless communication terminal respectively into a first field and a second field of a multi-station Block ACK frame which indicates whether at least one of MAC frames transmitted from at least one of wireless communication terminals is received, wherein the first field is for indicating an association identifier corresponding to an association of each of the at least one of wireless communication terminals with the base wireless communication terminal and the second field is for indicating Block ACK Bitmap,
   when the wireless communication terminal is associated with the base wireless communication terminal, insert an association identifier corresponding to an association of the wireless communication terminal with the base wireless communication terminal into the first field and set a value of second field based on at least one MAC frame received from the wireless communication terminal, and
   transmit the multi-station Block ACK frame,
   wherein the identifier for an unassociated wireless communication terminal is not allocated through an association with the base wireless communication terminal and not used for an associated wireless communication terminal, and
   wherein a value of the identifier for an unassociated wireless communication terminal is out of a range of values that is able to be allocated for the association identifier.

2. The base wireless communication terminal of claim 1, wherein the value of the identifier for an unassociated wireless communication terminal is generated based on the MAC address of the wireless communication terminal.

3. The base wireless communication terminal of claim 1, wherein the value of the identifier for an unassociated wireless communication terminal is a value pre-known to both the base wireless communication terminal and the wireless communication terminal.

4. The base wireless communication terminal of claim 1, wherein the processor is configured to transmit a trigger frame triggering random access,
   wherein the MAC frame transmitted from the wireless communication terminal is transmitted in response to the trigger frame.

5. The base wireless communication terminal of claim 4, wherein the trigger frame signals a frequency band allocated for random access by using a value of a specific association identifier,
   wherein the MAC frame transmitted from the wireless communication terminal is transmitted through the frequency band allocated for random access.

6. The base wireless communication terminal of claim 5, the MAC frame transmitted from the wireless communication terminal is a management frame.

7. A wireless communication terminal communicating wirelessly with a base wireless communication terminal comprising:
a transceiver; and
a processor,
wherein the processor is configured to:
receive, by using the transceiver, a multi-station Block ACK frame which indicates whether at least one of medium access control (MAC) frames transmitted from at least one of wireless communication terminals is received by using a first field of the multi-station Block ACK frame for indicating an association identifier corresponding to an association of each of the at least one of wireless communication terminals and the base wireless communication terminal and a second field of the multi-station Block ACK frame for indicating Block ACK Bitmap, from the base wireless communication terminal, and
when the wireless communication terminal is unassociated with the base wireless communication terminal and the first field of the multi-station Block ACK frame includes an identifier for an unassociated wireless communication terminal, determine whether a MAC frame transmitted from the wireless communication terminal is received by the base wireless communication terminal based on whether the second field of the multi-station Block Ack frame includes a MAC address of the wireless communication terminal,
when the wireless communication terminal is associated with the base wireless communication terminal and the first field of the multi-station Block ACK frame includes an association identifier corresponding to an association of the wireless communication terminal with the base wireless communication terminal, determine whether a MAC frame transmitted from the wireless communication terminal is received by the base wireless communication terminal based on a value of bit of the second field, which is corresponding to the MAC frame,
wherein the identifier for an unassociated wireless communication terminal is not allocated through an association with the base wireless communication terminal and not used for an associated wireless communication terminal, and
wherein a value of the identifier for an unassociated wireless communication terminal is out of a range of values that is able to be allocated for the association identifier.

8. The wireless communication terminal of claim 7, wherein the value of the identifier for an unassociated wireless communication terminal is generated based on the MAC address of the wireless communication terminal.

9. The wireless communication terminal of claim 7, wherein the value of the identifier for an unassociated wireless communication terminal is a value pre-known to both the base wireless communication terminal and the wireless communication terminal.

10. The wireless communication terminal of claim 7, wherein the processor is configured to receive a trigger frame triggering random access from the base wireless communication terminal,
transmit the MAC frame in response to the trigger frame, and
determine whether the MAC frame transmitted in response to the trigger frame is received by the base wireless communication terminal based on the multi-station Block ACK frame.

11. The wireless communication terminal of claim 10, wherein the trigger frame signals a frequency band allocated for random access by using a value of a specific association identifier,
wherein the processor is configured to transmit the MAC frame through the frequency band allocated for random access in response to the trigger frame.

12. The wireless communication terminal of claim 11, the MAC frame transmitted in response to the trigger frame is a management frame.

13. An operation method of a wireless communication terminal communicating with a base wireless communication terminal wirelessly and unassociated with the base wireless communication terminal, the method comprising:
receiving a multi-station Block ACK frame which indicates whether at least one of medium access control (MAC) frames transmitted from at least one of wireless communication terminals is received by using a first field of the multi-station Block ACK frame for indicating an association identifier corresponding to an association of each of the at least one of wireless communication terminals and the base wireless communication terminal and a second field of the multi-station Block ACK frame for indicating Block ACK Bitmap, from the base wireless communication terminal, and
when the wireless communication terminal is unassociated with the base wireless communication terminal and the first field of the multi-station Block ACK frame includes an identifier for an unassociated wireless communication terminal, determining whether a MAC frame transmitted from the wireless communication terminal is received by the base wireless communication terminal based on whether the second field of the multi-station Block ACK frame includes a MAC address of the wireless communication terminal,
when the wireless communication terminal is associated with the base wireless communication terminal and the first field of the multi-station Block ACK frame includes an association identifier corresponding to an association of the wireless communication terminal with the base wireless communication terminal, determining whether a MAC frame transmitted from the wireless communication terminal is received by the base wireless communication terminal based on a value of bit of the second field, which is corresponding to the MAC frame,
wherein the identifier for an unassociated wireless communication terminal is not allocated through an association with the base wireless communication terminal and not used for an associated wireless communication terminal, and
wherein a value of the identifier for an unassociated wireless communication terminal is out of a range of values that is able to be allocated for the association identifier.

14. The operation method of claim 13, wherein the value of the identifier for an unassociated wireless communication terminal is generated based on the MAC address of the wireless communication terminal.

15. The operation method of claim 13, wherein the value of the identifier for an unassociated wireless communication terminal is a value pre-known to both the base wireless communication terminal and the wireless communication terminal.

16. The operation method of claim 13, further comprising:
a trigger frame triggering random access from the base wireless communication terminal,
transmitting the MAC frame in response to the rigger frame, and
determining whether the MAC frame transmitted in response to the trigger frame is received by the base wireless communication terminal based on the multi-station Block ACK frame.

* * * * *